United States Patent
Yasutomi et al.

(10) Patent No.: US 9,007,469 B2
(45) Date of Patent: Apr. 14, 2015

(54) LENS BARREL AND IMAGE PICKUP DEVICE

(75) Inventors: Satoru Yasutomi, Hachioji (JP);
Manabu Yoshii, Yokohama (JP); Kunio Yamamiya, Sagamihara (JP); Naoki Fujii, Hachioji (JP); Masato Miyata, Machida (JP)

(73) Assignee: Olympus Imaging Corp., Tokyo (JP)

( * ) Notice: Subject to any disclaimer, the term of this patent is extended or adjusted under 35 U.S.C. 154(b) by 887 days.

(21) Appl. No.: 13/229,284

(22) Filed: Sep. 9, 2011

(65) Prior Publication Data

US 2012/0086821 A1  Apr. 12, 2012

(30) Foreign Application Priority Data

Sep. 10, 2010  (JP) .................................. 2010-203559
Nov. 11, 2010  (JP) .................................. 2010-252991

(51) Int. Cl.
| | |
|---|---|
| H04N 5/228 | (2006.01) |
| H04N 5/262 | (2006.01) |
| G02B 7/08 | (2006.01) |
| G03B 5/00 | (2006.01) |

(52) U.S. Cl.
CPC .. G02B 7/08 (2013.01); G03B 5/00 (2013.01); G03B 2205/0092 (2013.01)

(58) Field of Classification Search
USPC ........ 348/208.4, 240.99, 240.3; 359/686, 687
See application file for complete search history.

(56) References Cited

U.S. PATENT DOCUMENTS

| | | | | |
|---|---|---|---|---|
| 2007/0195425 | A1* | 8/2007 | Arai | 359/687 |
| 2008/0043348 | A1* | 2/2008 | Imagawa et al. | 359/813 |
| 2008/0247053 | A1* | 10/2008 | Iwasawa | 359/676 |
| 2010/0033838 | A1* | 2/2010 | Saori | 359/684 |

FOREIGN PATENT DOCUMENTS

| | | |
|---|---|---|
| JP | 2008-185786 | 8/2008 |
| JP | 2009-282127 | 12/2009 |

OTHER PUBLICATIONS

Office Action for Chinese Patent Application No. 201110268270.7, mailed Aug. 30, 2013 (3 pgs.) with translation (4 pgs.).
Office Action for Japanese Patent Application No. 2010-252991, mailed Jun. 17, 2014 (2 pgs.) with translation (2 pgs.).

* cited by examiner

*Primary Examiner* — Twyler Haskins
*Assistant Examiner* — Akshay Trehan
(74) *Attorney, Agent, or Firm* — John C. Pokotylo; Straub & Pokotylo

(57) ABSTRACT

Provided is a lens barrel having, in order from an object side to an image side, a first to a third group lens, the lens barrel including: a fixed frame; a cam frame supported by the fixed frame so as to be rotationally movable in a optical axis direction between a forward and a backward movement ends; and a shutter frame which moves in the optical axis direction in a rotation restricted state, through the rotation of the cam frame, in which: a third group frame is fixed to the shutter frame so that the object side of the third group lens is arranged on an inner peripheral side of the shutter frame; and the second frame is configured so that the image side of the frame is stored on the inner peripheral side of the shutter frame when the cam frame is positioned at the backward movement end.

15 Claims, 16 Drawing Sheets

LENS BARREL AND IMAGE PICKUP DEVICE

CROSS REFERENCE TO RELATED APPLICATIONS

The present application claims priority from Japanese Patent Applications No. 2010-203559 filed on Sep. 10, 2010, and No. 2010-252991 filed on Nov. 11, 2010, the contents of which are incorporated herein by reference.

TECHNICAL FIELD

The present invention relates to a lens barrel and an image pickup device.

RELATED ART

In recent years, digital cameras that make use of image sensors such as a charge coupled device (CCD) or a complementary metal-oxide semiconductor (CMOS) sensor so as to take a picture of a subject are in widespread use. There are various categories of digital cameras, including a highly-functional type for professional use to a popular type that is compact in size. In particular, the digital cameras of popular type are required to be miniaturized so as to be portable with ease anywhere at any time.

Further, most of the digital cameras of popular type employ a lens barrel for installing a zoom lens system, which is configured to be extendable and retractable in entire length between a photographable state in which the lens barrel is extended in an optical axis direction so as to project forward of a casing of the digital camera, and a retracted state in which the lens barrel is contracted from the extended state in the optical axis direction so as to be stored in the casing of the digital camera. In order to miniaturize the digital camera as a whole, the lens barrel needs to be reduced in size.

For this purpose, JP 2008-185786 A discloses a lens barrel which includes a zoom lens system including, in order from the object side, a first group lens to a fourth group lens, in which the displacement of the first lens frame, which holds the first group lens, extending in the optical axis direction is shared by two members, namely, a drive frame supported by a fixed frame and a cam frame supported by the drive frame, to thereby reduce the size of each member in a direction along the optical axis. With this configuration, the lens barrel is reduced in thickness in the optical axis direction when retracted.

SUMMARY OF THE INVENTION

In order to attain the above-mentioned object, according to a first aspect of the present invention, there is provided a lens barrel including:

a fixed frame of the lens barrel, the lens barrel at least having, in order from an object side to an image side, a first group lens having a positive refractive power, a second group lens having a negative refractive power, and a third group lens having a positive refractive power;

a cam frame supported by the fixed frame so as to be rotationally movable in a photographing optical axis direction between a forward movement end and a backward movement end which are each defined in the photographing optical axis direction;

a guide flame which moves in a rotation restricted state together with the cam frame, in the photographing optical axis direction;

a shutter frame which holds a shutter and moves in the photographing optical axis direction in a rotation restricted state, through the rotation of the cam frame;

a first group frame which holds the first group lens, fits in an inner periphery of the guide frame, and moves in the photographing optical axis direction in the rotation restricted state, through the rotation of the cam frame;

a second group frame which holds the second group lens, moves in the photographing optical axis direction in a rotation restricted state, through the rotation of the cam frame, and, upon the cam flame being positioned at the backward movement end, fits in, at least in part thereof on the image side, an inner peripheral side of the shutter frame; and a third group frame which holds the third group lens formed of five lenses including two negative lenses, and fixed as fitting, at least in part thereof on the object side, in the inner peripheral side of the shutter frame.

According to a second aspect of the present invention, the lens barrel according to the first aspect further includes, between the third group lens and an image surface, a fourth group lens having a positive refractive power, in which the third group lens includes, in order from the object side to the image side, a first lens as a positive lens, a second lens as a positive lens, a third lens as a negative lens, a fourth lens as a negative lens, and a fifth lens as a positive lens, the second lens and the third lens forming a cemented lens, the fourth lens and the fifth lens forming a cemented lens.

According to a third aspect of the present invention, in the lens barrel according to the second aspect, the fourth lens is larger in diameter than the firth lens, the fourth lens is held by the third group frame, and the fifth lens is held by the fourth lens as being cemented thereto.

According to a fourth aspect of the present invention, the lens barrel according to the first aspect further includes an ND filter which is provided to the third group frame, on the image side of the third group lens.

According to a fifth aspect of the present invention, the lens barrel according to the fourth aspect further includes an ND filter frame disposed on the image side of the third group frame, in which, in the third group lens, at least part on the image side of a lens surface of the fifth lens cemented to and held by the fourth lens falls inside the ND filter frame when viewed from a direction orthogonal to the photographing optical axis.

According to a sixth aspect of the present invention, in the lens barrel according to the fifth aspect, at least in a retracted state, at least part of the ND filter frame falls inside the fourth group frame when viewed from a direction orthogonal to the photographing optical axis.

According to a seventh aspect of the present invention, in the lens barrel according to the fifth aspect, the ND filter frame is provided with an aperture stop member.

According to an eighth aspect of the present invention, in the lens barrel according to the fifth aspect, the ND filter frame is provided with a plurality of aperture stop members.

According to a ninth aspect of the present invention, in the lens barrel according to the eighth aspect, one of the plurality of aperture stop members is arranged in contact with the fifth lens of the third group lens.

According to a tenth aspect of the present invention, in the lens barrel according to the fifth aspect, the shutter frame and the ND filter frame are each arranged on the object side and the image side of the third group frame, respectively, and at least one of the shutter frame and the ND filter frame is fixed to the third group frame using a through hole formed in the third filter frame.

According to an eleventh aspect of the present invention, in the lens barrel according to the tenth aspect, the third group frame has a screw hole portion formed therein, and another one of the shutter frame and the ND filter frame that is not fixed using the through hole is fixed to the third group frame using a single screw to be threaded into the the screw hole portion.

According to a twelfth aspect of the present invention, in the lens barrel according to the first aspect, the first group flame, the second group frame, and the third group frame are directly engaged with the cam frame.

In order to attain the above-mentioned object, according to a thirteenth aspect of the present invention, there is provided an image pickup device including:

the lens barrel according to the first aspect;

an image sensor for forming image data upon reception of an optical image formed through the first group lens, the second group lens, the third group lens, and the fourth group lens; and an image blur correction device for performing an image blur correction operation by displacing the image sensor in a plane parallel to a light receiving surface of the image sensor.

According to a fourteenth aspect of the present invention, in the image pickup device according to the thirteenth aspect, the lens barrel includes a focus drive unit for driving the fourth group lens forward and backward along an optical axis, and part of the focus drive unit passes through the image blur correction device so as to avoid interference with the image blur correction device.

According to a fifteenth aspect of the present invention, in the image pickup device according to the fourteenth aspect, the focus drive unit is provided with a focus motor serving as a drive source of the fourth group lens, and part of the focus motor passes through the image blur correction device.

According to a sixteenth aspect of the present invention, in the image pickup device according to the fourteenth aspect, the image blur correction device includes: a base member having the lens barrel fixed thereto; a slider supported by the base member so as to be movable in a first direction orthogonal to the optical axis; and a sensor holding frame for holding the image sensor supported by the slider so as to be movable in a second direction orthogonal to the optical axis and to the first direction, and part of the focus drive unit passes through the outside of a moving region of the sensor holding frame within a region of the slider, with respect to the optical axis direction.

BEST MODES FOR CARRYING OUT THE INVENTION

Figure 1:
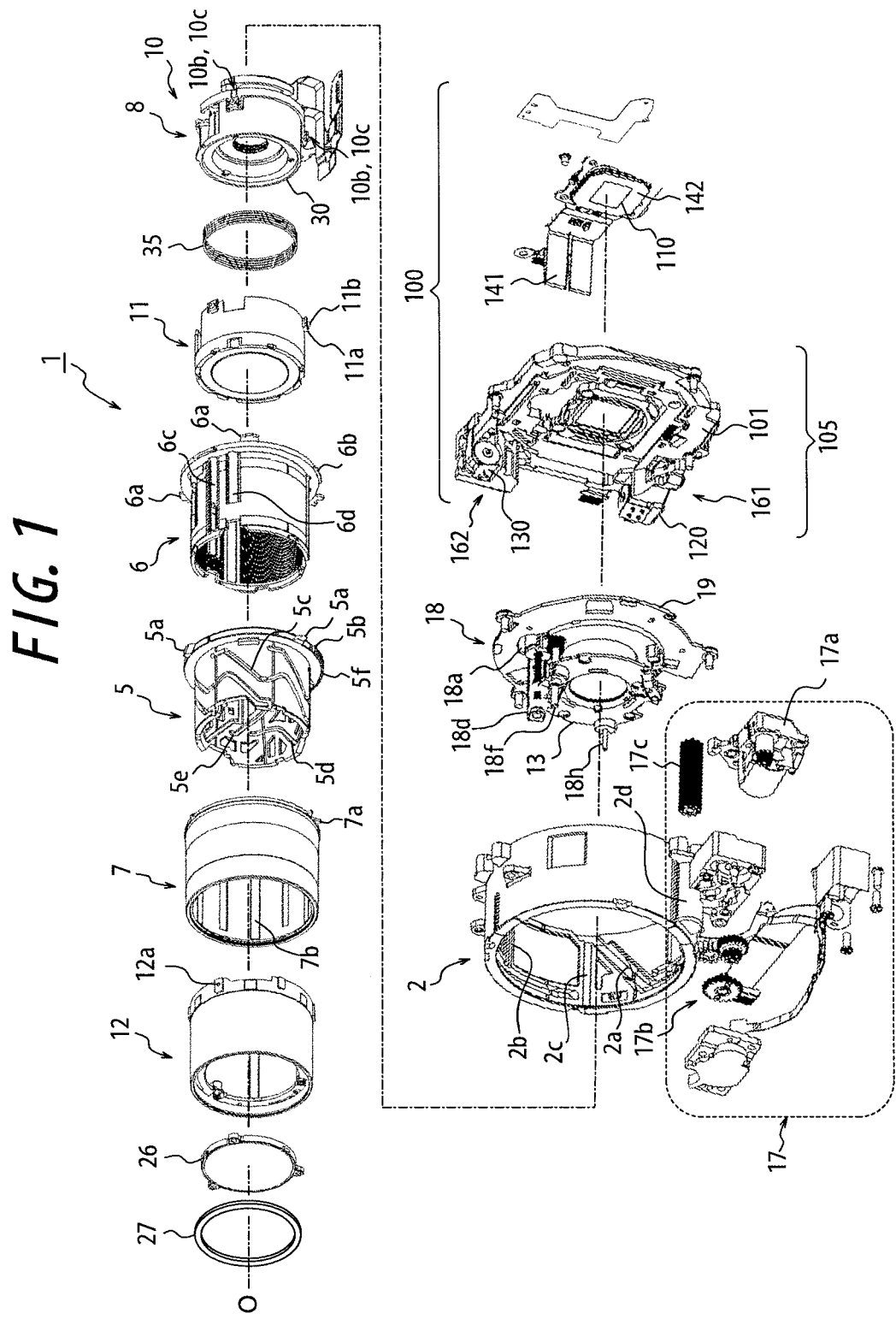
FIG. 1 is an exploded perspective view illustrating a configuration of a main part of an image pickup unit including a lens barrel and a sensor unit forming an image pickup device according to a first embodiment of the present invention.

In the following, an image pickup device according to an embodiment of the present invention is described with reference to the accompanying drawings.

In the description of the embodiment, an optical axis (photographing optical axis) of an imaging optical system in a lens barrel is defined as an optical axis O. In a direction (photographing optical axis direction) along the optical axis O, a subject side (object side) is defined as "forward", and a direction in which frame members included in the lens barrel move forward is referred to as "drawing-out direction". On the other hand, in the direction along the optical axis O, an imaging side (image side) is defined "backward", and a direction in which the frame members move backward is referred to as "drawing-in direction". Further, the rotating direction of each of the members in the lens barrel is defined with reference to the rotating direction viewed from the forward side.

The image pickup device of this embodiment employs an extendible and retractable imaging optical system, namely, a lens barrel. This lens barrel is configured in such a manner that the entire length thereof is extendable and retractable between a photographing stand-by state (photographable state) and a retracted state. The photographing stand-by state is an in-use state in which the lens barrel is extended in a direction along the optical axis O to project forward of a casing of the image pickup device so as to be in a mode capable of performing photographing operation, that is, in a mode of being ready for photographing operation. The retracted state is a non-use state in which the lens barrel is not in service for a photographing operation as being contracted from the extended state in a direction along the optical axis so as to be stored in the casing of the image pickup device. The lens barrel further has an extendable mechanism for drawing out or drawing in, in the photographing stand-by state, a plurality of frame members between a short-focal position (wide-end) and a long-focal position (tele-end), to thereby enable magnification varying operation (zooming).

First, with reference to FIGS. 1 to 4, a configuration of the lens barrel is described.

The lens barrel 1 includes: a fixed frame 2 fixed to a base member 101 of a sensor unit 100; a cam frame 5 which is supported by the fixed frame 2 and is rotary driven and also driven forward and backward in a direction along the optical axis O during zooming operation and retracting operation; a float key 6 which moves, together with the cam frame 5, forward and backward in a direction along the optical axis O in a rotation restricted state; a guide frame 7 which moves, together with the cam frame 5, forward and backward in a direction along the optical axis O in a rotation restricted state; a first group frame 12 which holds a first group lens 21 and moves, through the rotation of the cam frame 5, forward and backward in a direction along the optical axis O in a rotation restricted state; a second group frame 11 which holds a second group lens 22 and moves, through the rotation of the cam frame 5, forward and backward in a direction along the optical axis O in a rotation restricted state; a shutter/third group unit 8 supporting a third group frame 10 and a shutter, the third group frame 10 holding a third group lens 23, the shutter/third group unit 8 moving, through the rotation of the cam frame 5, forward and backward in a direction along the optical axis O in a rotation restricted state; and a fourth group frame 13 holding a fourth group lens 24 (focusing lens) coupled to the fixed frame 2 so as to be movable forward and backward in a direction along the optical axis O. Here, the first group lens 21, the second group lens 22, the third group lens 23, and the fourth group lens 24 form an imaging lens system.

In the lens barrel 1, the cam frame 5 rotates when moving between a backward movement end and a forward movement end, and positioning between the retracted state and the photographable state is performed through the rotation of the cam frame 5, so that the first group lens 21, the second group lens 22, the third group lens 23, and the fourth group lens 24 are arranged in this order along the optical axis O from the object side to the image side in the photographable state. Further, a fixed-position rotation of the cam frame 5 at the forward movement end renders a magnifying effect.

The fixed frame 2 is formed in a cylindrical shape, and has, on an inner periphery thereof, cam grooves 2a including a plurality of inclined cam groove portions which are formed in a direction inclined relative to the optical axis O and connected to a circumferential groove portion formed in a direction along a circumference, and a plurality of rectilinear grooves 2b formed in the optical axis direction. The fixed frame 2 includes, on an outer periphery thereof, a zoom drive unit 17 for performing zooming operation of the imaging optical system. Further, the fixed frame 2 includes a focus drive unit 18 disposed therein for performing focusing operation of the imaging optical system.

The zoom drive unit 17 includes: a zoom motor 17a serving as a zoom drive source; a gear train (rotation transmitting mechanism) 17b for transmitting a drive force of the zoom motor 17a; a position sensor (not shown) for detecting a position of the cam frame 5; and a long gear 17c. The zoom motor 17a is used to drive, of the imaging optical system of the lens barrel 1, a zoom optical system (the first group lens 21, the second group lens 22, the third group lens 23) which contributes to zooming operation, in a direction along the optical axis O, to thereby perform zooming operation, and also to drive the lens barrel 1 from the photographable state to the retracted state, to thereby perform retracting operation. The long gear 17c of the zoom drive unit 17 is rotatably supported in a state where the rotational axis thereof arranged in a gear storage portion 2d of the fixed frame 2 becomes parallel to the optical axis O and is exposed to the inner periphery of the fixed frame 2.

The focus drive unit 18 includes: a focus motor 18a serving as a focus drive source having a motor shaft arranged parallel to the optical axis O; a lead screw 18b formed integrally with a rotational axis of the focus motor 18a; a nut 18c threadably mounted on the lead screw 18b; and a position sensor (not shown) formed of a photo interrupter for detecting an origin position of a focusing optical system (the fourth group lens 24) which contributes to focusing operation, of the imaging optical system of the lens barrel 1. Then, the fourth group lens 24 is driven in a direction along the optical axis O using the focus motor 18a. The configuration and operation of the focus drive unit 18 are described later in detail.

The cam frame 5 is formed in a cylindrical shape, and rotatably fitted into the inner periphery of the fixed frame 2 so as to be movable forward and backward. Formed on the backward outer periphery of the cam frame 5 are a plurality of cam followers 5a, which are to be slidably fitted into the plurality of cam grooves 2a of the fixed frame 2, and a gear portion 5b to mesh with the long gear 17c of the zoom drive unit 17.

As described above, the cam followers 5a of the cam frame 5 are slidably fitted into the cam grooves 2a of the fixed frame 2, and the gear portion 5b is in mesh with the long gear 17c. Therefore, when the long gear 17c is rotary driven through the driving of the zoom motor 17a of the zoom drive unit 17, the driving force is transmitted to the cam frame 5 via the gear portion 5b so as to rotate the cam frame 5. When the cam frame 5 is rotated in this manner, the cam followers 5a of the cam frame 5 move along the inclined cam groove portions of the inclined cam grooves 2a of the fixed frame 2, so that the cam frame 5 is drawn out forward as being rotated from a position (backward movement end) in the retracted state to the wide-end (forward movement end) as a short-focal position in the photographable state. Then, when the lens barrel 1 is in the photographable state, the cam followers 5a and the circumferential groove portion of the cam grooves 2a allow the cam frame 5 to be driven only in a rotational direction at the forward movement end without moving forward and backward in a direction along the optical axis O, during zooming operation from the wide-end as a short-focal position to the tele-end as a long-focal position.

Further, formed on an outer periphery of the cam frame 5 is a first group cam groove 5c in a direction inclined relative to the optical axis O, and formed on an inner periphery thereof are a second group cam groove 5d and a third group cam groove 5e in a direction inclined relative to the optical axis O.

The float key 6 is formed in a cylindrical shape, and fitted into the inner periphery of the cam frame 5 so as to be rotatable in a relative manner. On a posterior end on an outer periphery of the float key 6, a guide projection portion 6a to be fitted into the rectilinear grooves 2b of the fixed frame 2 is formed to project outward. With this configuration, the float key 6 is capable of moving, together with the cam frame 5, forward and backward in a direction along the optical axis O in a rotation restricted state with respect to the fixed frame 2.

The float key 6 is arranged to be fitted into the inner periphery of the cam frame 5 with a bayonet projection portion 6b being fitted into an outer peripheral groove 5g formed as a circular concave portion in a flange portion 5f of the cam frame 5. With this configuration, the float key 6 is bayonet-coupled to the cam frame 5 so as to be rotatable with respect to the cam frame 5 in a relative manner without moving forward and backward, with respect to the cam frame 5, in a direction along the optical axis O in a relative manner.

Further, the float key 6 has a second group rectilinear groove 6c and a third group rectilinear groove 6d, which are formed so as to run through the inner periphery and outer periphery of the float key 6 in a direction along the optical axis O.

Further, a guide projection portion 11a of the second group frame 11 is fitted into the second rectilinear groove 6c of the float key 6, and a guide projection portion 10b of the third group frame 10 is fitted into the third rectilinear groove 6d. With this configuration, the float key 6 supports the second group frame 11 and the shutter/third group unit 8 so as to be movable forward and backward while restricting the rotation thereof.

The guide frame 7 is formed in a cylindrical shape, and has, on the posterior end on the inner periphery thereof, a bayonet projection (not shown) to be fitted into a coupling groove (not shown) of the cam frame 5. Further, formed on the inner periphery of the guide frame 7 is a rectilinear groove 7b in a direction along the optical axis O, so that a cam follower 12a formed on the backward outer periphery of the first group frame 12 is fitted thereinto.

Then, the guide frame 7 is arranged as being bayonet-coupled to the cam frame 5, in a state of being fitted in the inner periphery of the fixed frame 2. At this time, a guide projection portion 7a of the guide frame 7 is fitted into a rectilinear groove 2c of the fixed frame 2. With this configuration, the guide frame 7 is adapted to integrally move with the cam frame 5 in a direction along the optical axis O in a rotation restricted state with respect to the fixed frame 2, similarly to the float key 6.

The second group frame 11 is formed in a cylindrical shape, and arranged so as to be fitted into the inner periphery of the float key 6. The second group frame 11 holds, in substantially the center thereof, the second group lens 22, and has a guide projection portion 11a formed on the outer periphery thereof to project outward and a cam follower 11b formed on the guide projection portion 11a to project outward.

The guide projection portion 11a is fitted into the second group rectilinear groove 6c of the float key 6, and the cam follower 11b is inserted through the second group rectilinear groove 6c so as to be slidably fitted into the second group cam groove 5b of the cam frame 5 formed lateral to the second group rectilinear groove 6c. In this manner, the second group frame 11 is adapted to be driven forward and backward through the rotation of the cam frame 5 in a rotation restricted state with respect to the float key 6.

Further, the second group frame 11 is configured in such a manner that part on the image side of the second group frame 11 is to be fitted into the inner peripheral side of the shutter frame 30, together with part of a lens on the image side, when the cam frame 5 is positioned at the backward movement end.

The first group frame 12 is formed in a cylindrical shape, and arranged as being fitted in between the cam frame 5 and the guide frame 7. The first group frame 12 holds, on the object side thereof, the first group lens 21. Further, the first group frame 12 has, on the inner periphery thereof, a plurality of (for example, three) cam followers (not shown) arranged inward at equal intervals in the inner peripheral direction so as to be fitted into the first group cam groove 5c formed on the outer periphery of the cam frame 5.

Further, as described above, the cam follower 12a formed on the posterior end on the outer periphery of the first group frame 12 is fitted into the rectilinear groove 7b formed on the inner periphery of the guide frame 7, and the cam followers formed on the inner periphery of the first group frame 12 are fitted into the first group cam groove 5c formed on the outer periphery of the cam frame 5. With this configuration, the first group frame 12 is adapted to be driven forward and backward through the rotation of the cam frame 5 in a rotation restricted state with respect to the guide frame 7.

Figure 5:
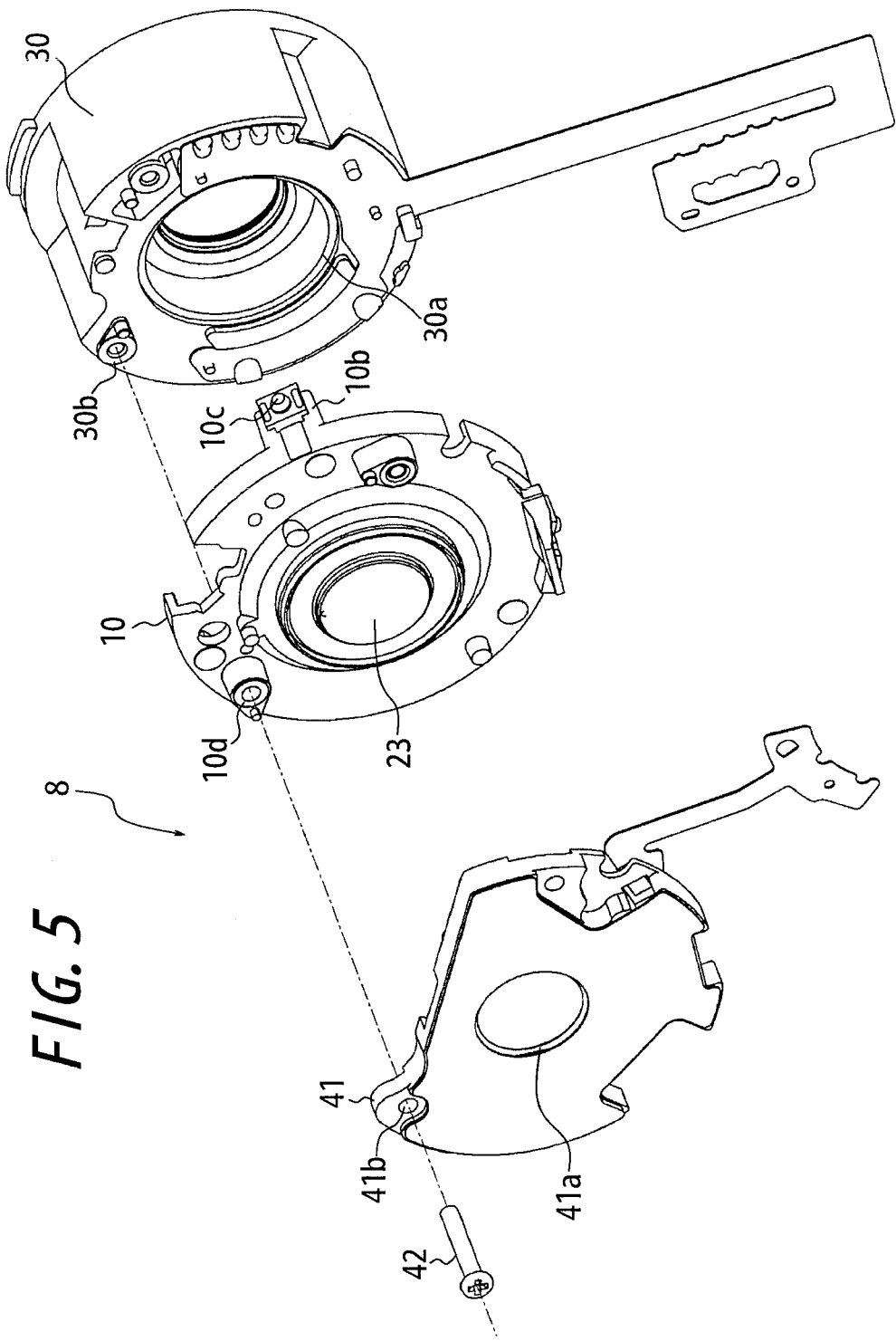
FIG. 5 is an exploded perspective view of a shutter/third group unit of FIG. 1.

FIG. 5 is an exploded perspective view of the shutter/third group unit 8 of FIG. 1. In FIG. 5, the image side is on the left side and the object side is on the right side. The shutter/third group unit 8 is configured by including: a shutter frame 30 for holding a shutter mechanism; a third group frame 10 for holding the third group lens 23 posteriorly to the shutter 30; and a neutral density (ND) filter frame 41 for holding a neutral density filter (ND filter) 40 on the posterior side of the third group frame 10.

The shutter frame 30 is formed of a member in substantially a circular shape having an opening 30a in substantially a center thereof, which holds a shutter mechanism (not shown) including a shutter blade for opening and closing the central opening and a shutter actuator for rotary driving the shutter blade.

The third group frame 10 has a holding portion 10a (see FIGS. 2 to 4) in a cylindrical shape for holding the third group lens 23, and is fixed to the shutter frame 30 with the holding portion 10a being fitted inside the shutter frame 30 from behind the shutter frame 30. Further, the third group frame 10 has, on the forward outer periphery, a plurality of (for example, three) guide projection portions 10b formed outward at equal intervals in the outer peripheral direction, and the guide projection portions 10b each have a cam follower 10c formed to project further outward.

Further, as illustrated in FIGS. 1 to 4, the third group frame 10 is disposed as being fitted inside the float key 6, so that the guide projection portion 10b is fitted into the third group rectilinear groove 6d of the the float key 6 and the cam follower 10c is inserted through the third group rectilinear groove 6d so as to be fitted into the third group cam groove 5e of the cam frame 5. With this configuration, the shutter frame 30 is adapted to be driven forward and backward by the cam frame 5 in a rotation restricted state with respect to the float key 6.

Figure 2:
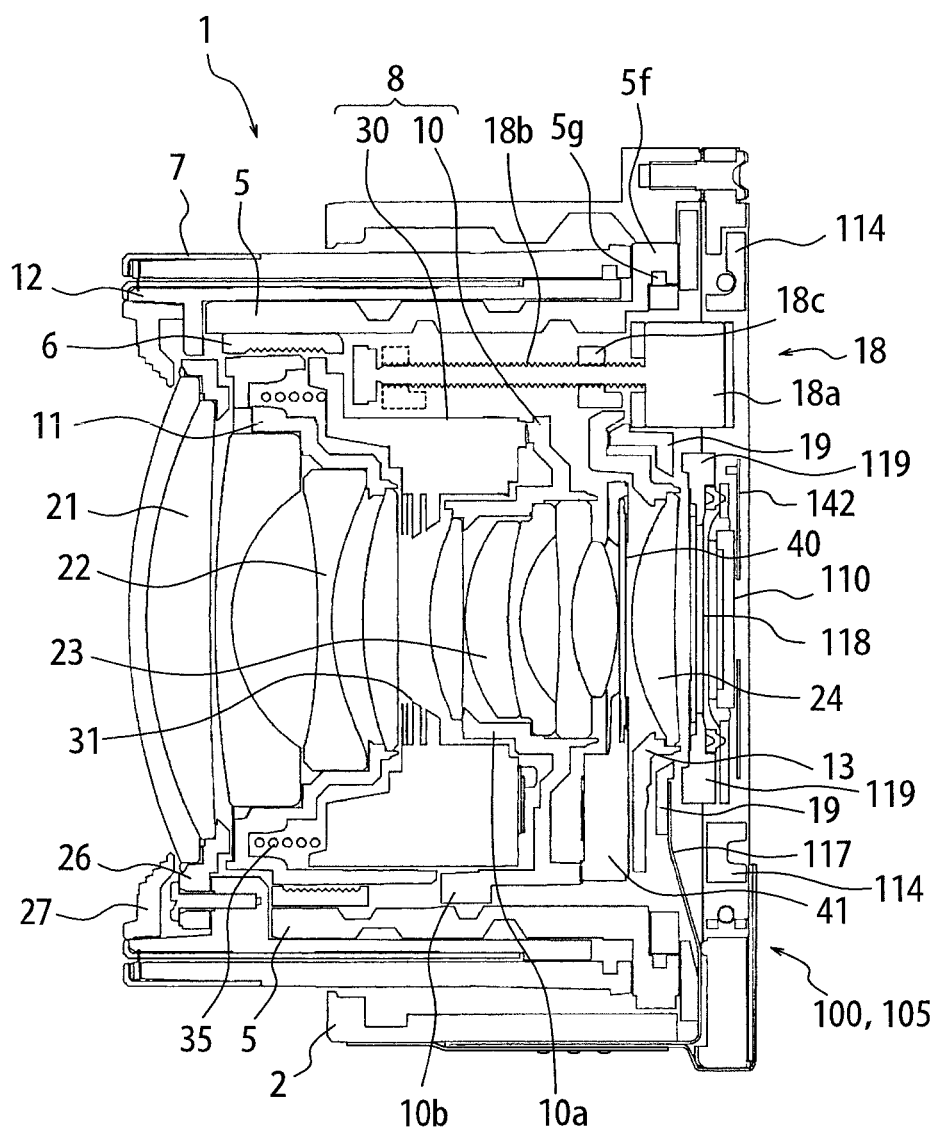
FIG. 2 is a sectional view of the image pickup unit of FIG. 1 in a retracted state.
Figure 3:
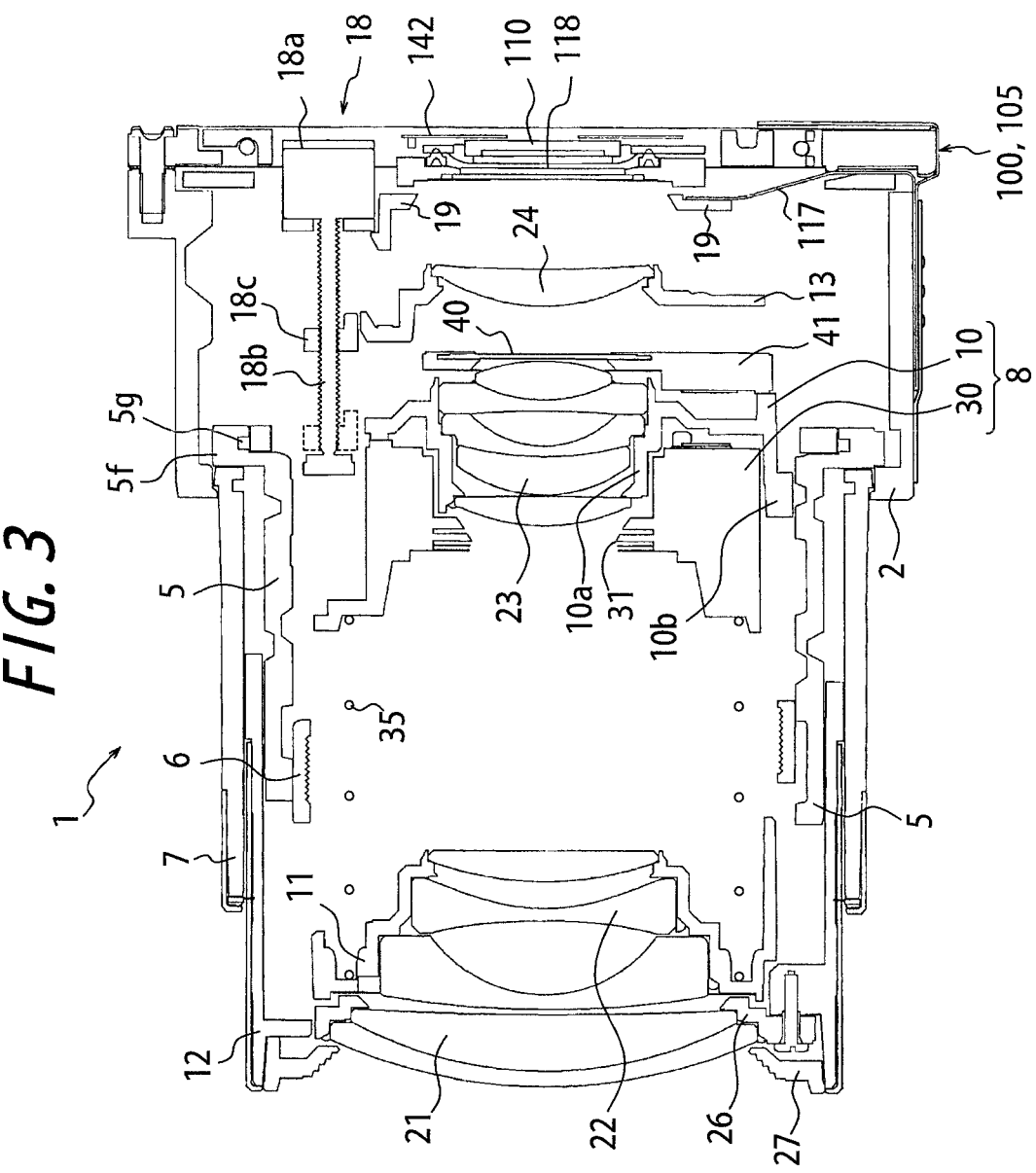
FIG. 3 is a sectional view of the image pickup unit of FIG. 1 at a wide position.
Figure 4:
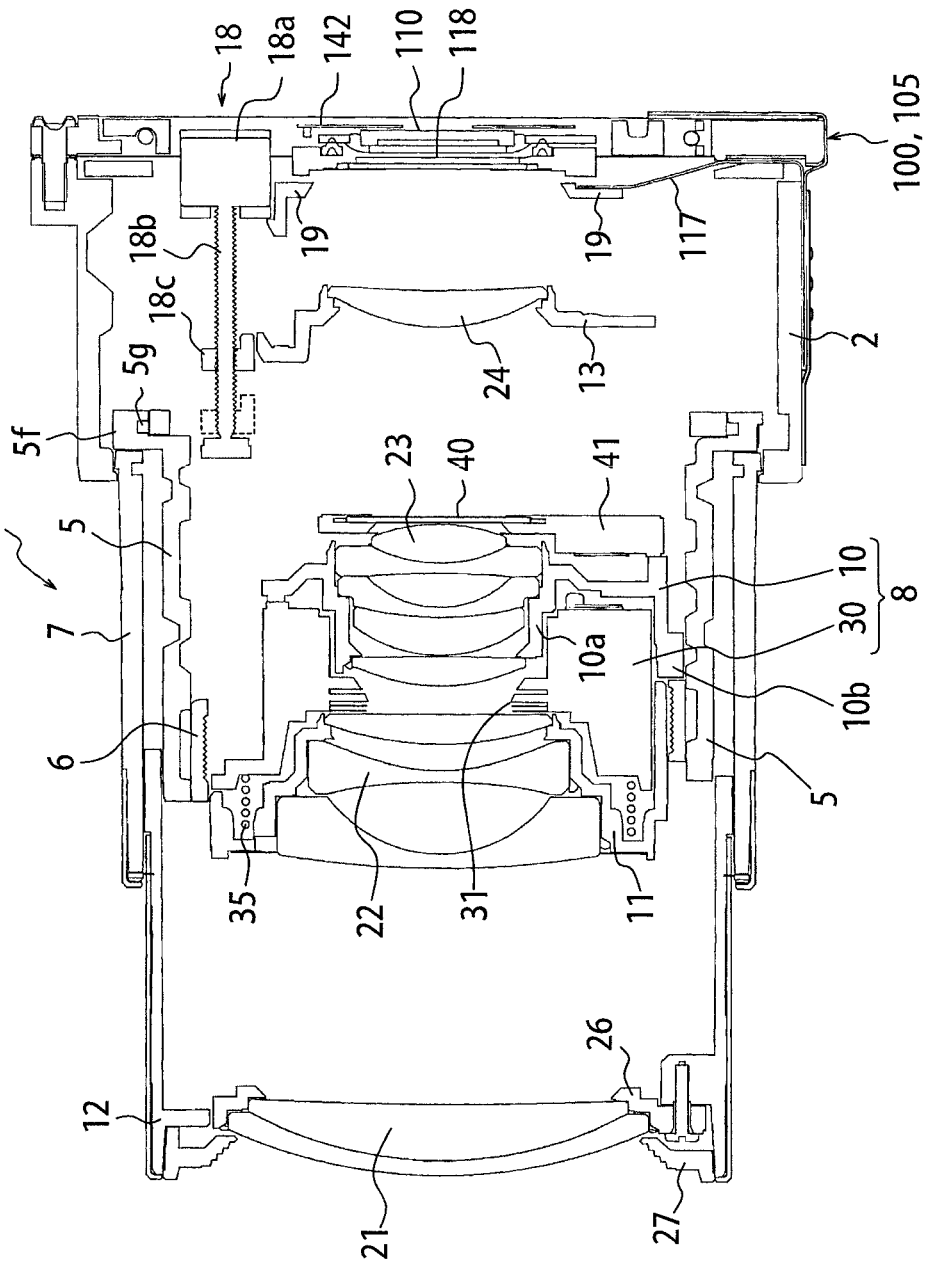
FIG. 4 is a sectional view of the image pickup unit of FIG. 1 at a tele position.

As illustrated in FIGS. 2 to 4, a coil spring 35 is disposed between the second group frame 11 and the shutter/third group unit 8. With this configuration, the second group frame 11 and the shutter/third group unit 8 are biased in a direction away from each other. The coil spring 35 is inserted in such a manner that one end thereof is fitted into the inner periphery of the shutter frame 30 of the shutter/third group unit 8 while the other end thereof is fitted into the outer periphery of a lens holder portion of the second group frame 11.

Further, as described above, the neutral density filter (ND filter) 40 is attached on the image side of the third group lens 23. This configuration is advantageous as compared to the case where the ND filter 40 is arranged in the shutter frame 30, because the shutter and the ND filter 40 are not closely arranged in a small area, making the device arrangement easy. Further, as described later, at the back of the third group lens 23, a stop member for controlling the entrance of ambient light beams is provided to the ND filter frame 41, and then the ND filter 40 is disposed on the image side of the third group lens 23 adjacent to the shutter frame 30. With this configuration, the ND filter 40 to be employed can be reduced in size, as compared to the case of arranging the ND filter 40 in other positions.

The shutter frame 30 has a screw hole 30b formed therein as being screw-threaded on the image side in proximity to the outer periphery, in a direction along the optical axis. Further, the third group frame 10 and the ND filter frame 41 have through holes 10*d* and 41*b*, respectively, formed therein without being screw-threaded, at positions each corresponding to the screw hole 30*d*. As illustrated in FIG. 5, the ND filter frame 41 and the third group frame 10 are screwed to the shutter frame 30 via a screw 42 threaded into the screw hole 30*b* through the through holes 41*b* and 10*d*. In this manner, the shutter/third group unit 8 is fixed so as to clamp the third group frame 10 between the shutter frame 30 and the ND filter frame 41. At this time, the third group frame 10 is not subjected to torsional stress resulting from the screwing, and hence the third group lens 23 is free from undesired distortion and deflection.

Further, as illustrated in FIGS. 2 to 4, when fixed as described above, at least part of a lens surface on the image side of a fifth lens cemented and held by a fourth lens in the third group lens 23 falls inside the ND filter frame 41 with respect to a direction orthogonal to the photographing optical axis. With this configuration, the third group frame 10 and the ND filter frame 41 account for a smaller space. Further, as illustrated in FIG. 2, in the retracted state, the ND filter frame 41 is adapted, at least in part thereof, to fall inside the fourth group frame 24 with respect to a direction orthogonal to the photographing optical axis. With this configuration, the lens barrel 1 in the retracted state can be configured further smaller in the optical axis direction.

Figure 6:
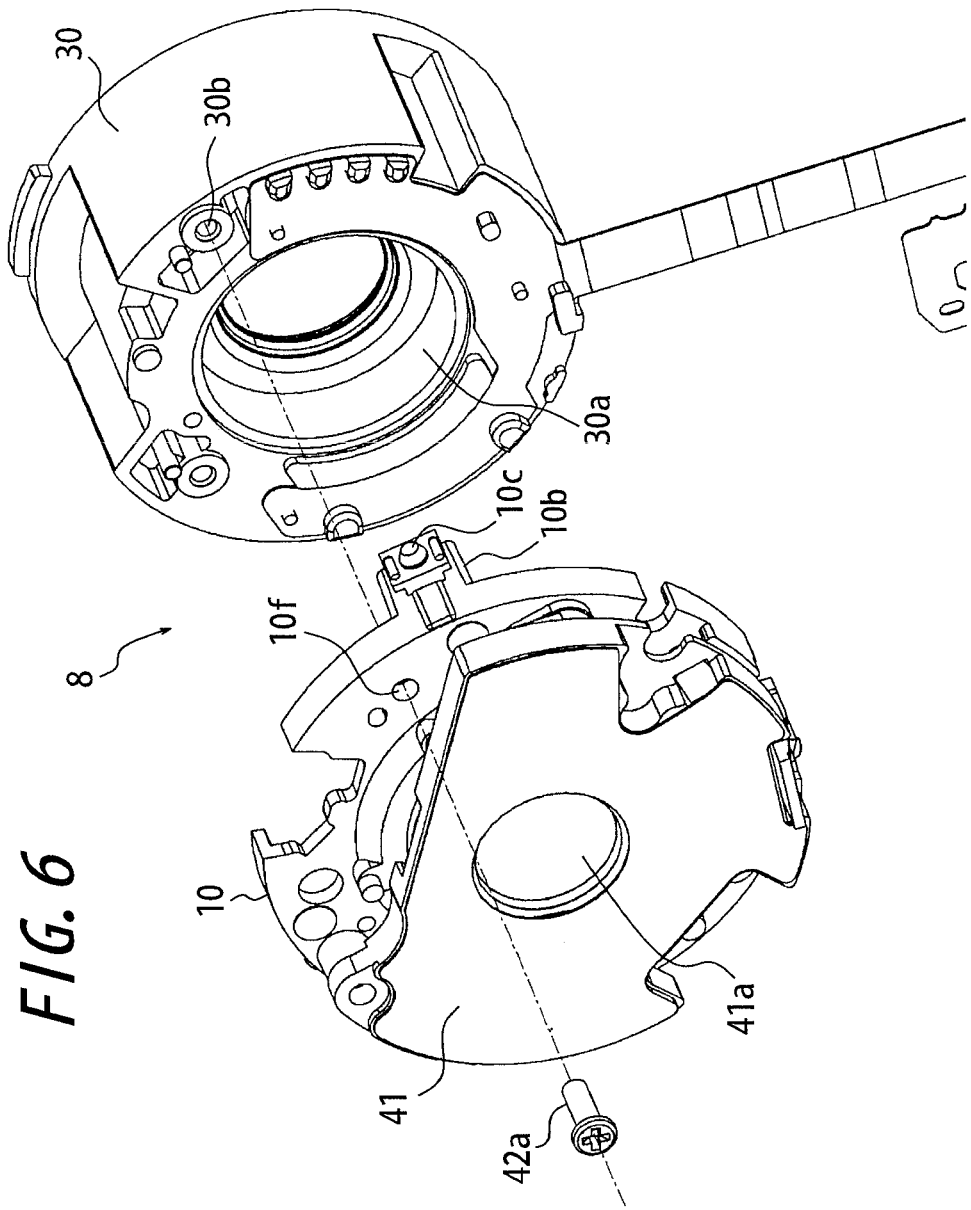
FIG. 6 is a perspective view illustrating a modified example of an assembled state of the shutter/third group unit.

FIG. 6 is a perspective view illustrating a modified example of an assembled state of the shutter/third group unit 8. In the drawing, the third group frame 10 and the ND filter frame 41 are assembled in advance, which are screwed to the shutter frame 30 via a screw 42*a* threaded into the screw hole 30*b* through a screw hole 10*f* formed in the third group frame 10, to thereby assemble the shutter/third group unit 8. Here, the ND filter frame 41 has a cutout portion so as not interfere with the screw 42*a* passing through the through hole 10*f* from the image side.

Figure 7:
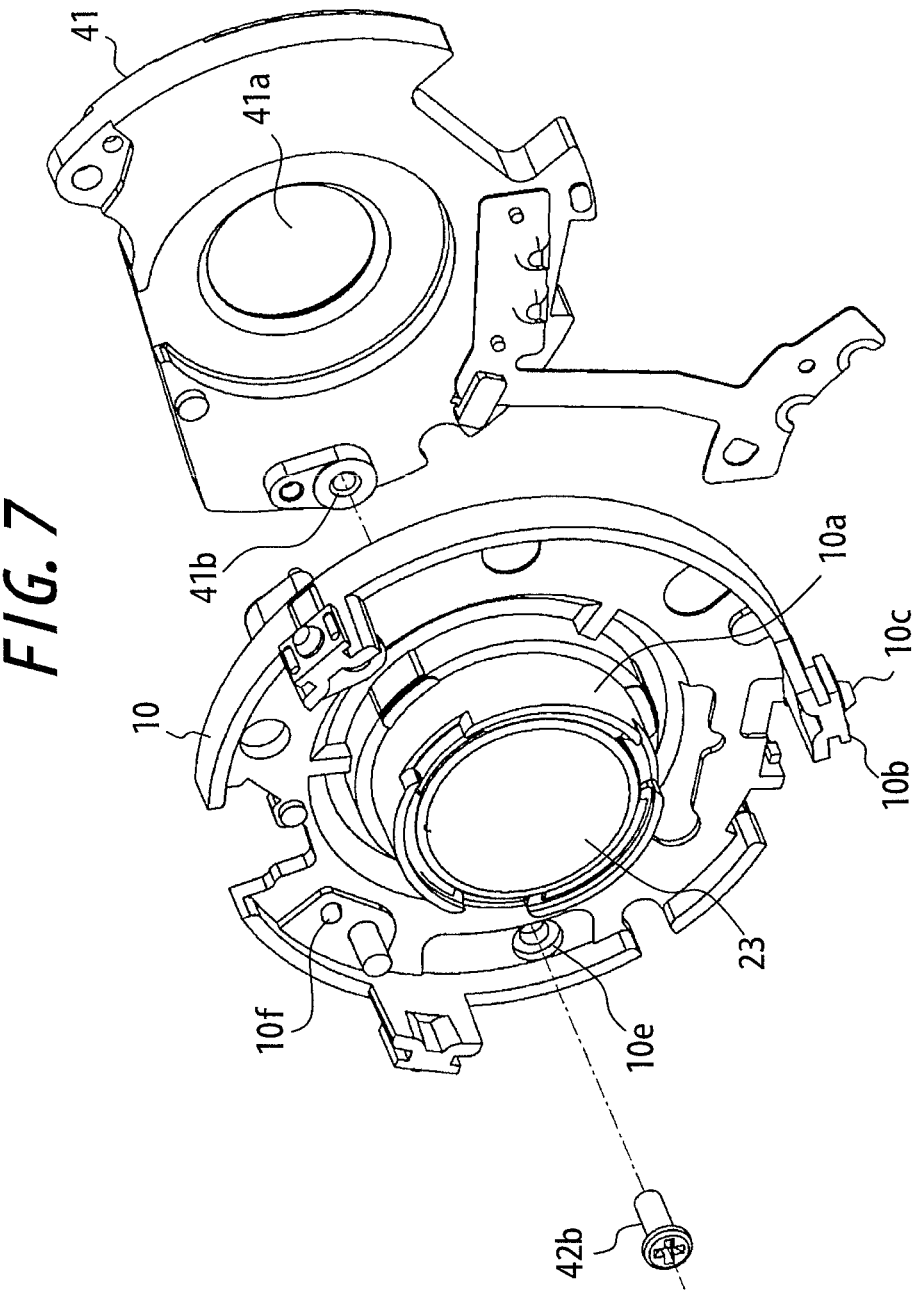
FIG. 7 is a partial exploded perspective view of the third group frame and the ND filter frame of FIG. 6.

FIG. 7 is an exploded perspective view illustrating part of the third group frame 10 and the ND filter frame 41 of FIG. 6. In FIG. 7, the object side is on the left side and the image side is on the right side. The ND filter frame 41 has a screw hole 41*b* formed therein, and the third group frame 10 has a through hole 10*e* formed therein which is not screw-threaded. The third group frame 10 and the ND filter frame 41 are fixed to each other via a screw 42*b* threaded into the screw hole 41*b* from the object side through the through hole 10*e*. In this case, in the shutter/third group unit 8, screw holes for threadably coupling the third group frame 10, the shutter frame 30, and the ND filter frame 41 to one another are formed only in the shutter frame 30 and in the ND filter frame 41. In this case, similarly to the assembled state of FIG. 5, the third group frame 10 is not subjected to torsional stress resulting from the screwing, and hence the third group lens 23 is free from undesired distortion and deflection.

In each of the assembled states illustrated in FIGS. 5, 6, and 7, the components are screwed only at one point. However, the shutter frame 30, the third group frame 10, and the ND filter frame 41 each may have a plurality of through holes or screw holes so that the components are screwed to each other via a plurality of screws.

Figure 8:
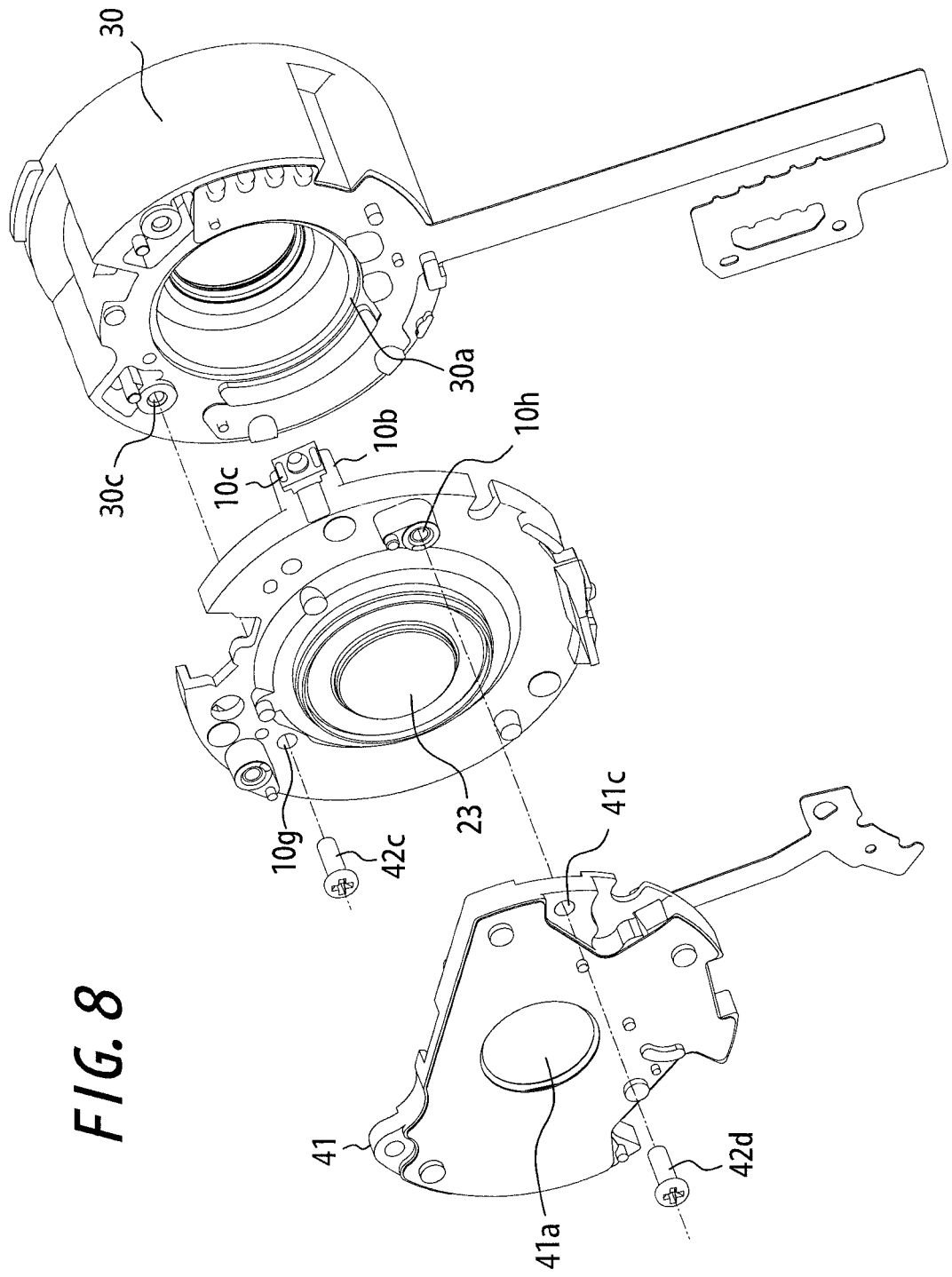
FIG. 8 is a perspective view illustrating another modified example of an assembled state of the shutter/third group unit.

FIG. 8 is a perspective view illustrating another modified example of an assembled state of the shutter/third group unit 8. The shutter frame 30 has a screw hole 30*c* formed therein as being screw-threaded on the image side in proximity to the outer periphery, in a direction along the optical axis. Further, the third group frame 10 has a through hole 10*g* formed therein without being screw-threaded, at a position corresponding to the screw hole 30*c*. As illustrated in FIG. 8, the third group frame 10 is screwed to the shutter frame 30 via a screw 42*c* threaded into the screw hole 30*c* through the through hole 10*g*. In this manner, the third group frame 10 and the shutter frame 30 are fixed to each other. Meanwhile, the third group frame 10 has a screw hole 10*h* formed separately from the through hole 10*g*. Further, the ND filter frame 41 has a through hole 41*c* formed therein, at a position corresponding to the screw hole 10*h*. Then, the ND filter frame 41 is screwed to the third group frame 10 at one point at the screw hole 10*h* via the through hole 41*c*. With this configuration, the third group frame 10 is not subjected to torsion stress resulting from the screwing with respect to the shutter frame 30. On the other hand, the third group frame 10 is screwed to the ND filter frame 41 at one point, so that the torsion stress resulting from the screwing is limitedly applied to the third group frame at only one point. Therefore, the occurrence of undesired distortion and deflection in the third group lens can be suppressed to a minimum. Alternatively, the third group frame, the shutter frame, and the ND filter frame may be fixed to one another in the following manner. That is, the third group frame may be screwed to the ND filter at the screw hole through the through hole, while the shutter frame may be screwed to the third group frame at one point at the screw hole through the through hole.

Figure 9:
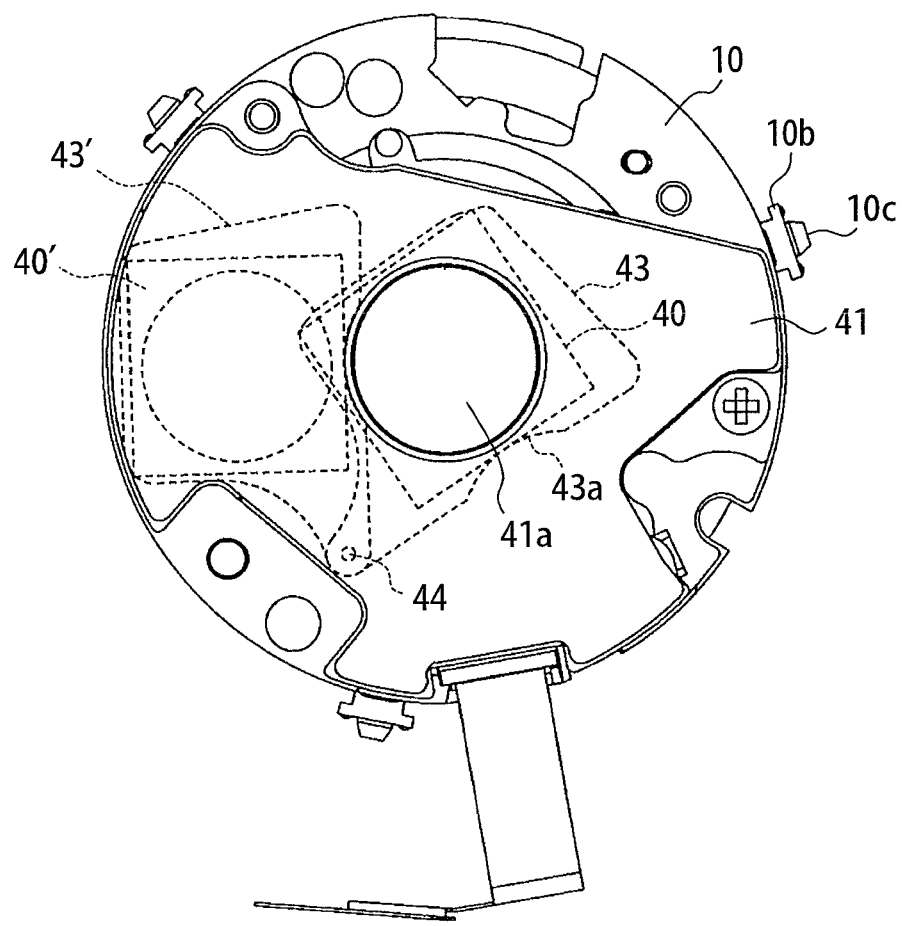
FIG. 9 is a view illustrating the shutter/third group unit viewed from an image side, together with the arrangement of the ND filter.

FIG. 9 illustrates the shutter/third group unit 8 viewed from the image side, together with the arrangement of the ND filter 40. The ND filter 40 is adapted to be driven by an electromagnetic drive mechanism (not shown) provided to the ND filter frame 41 so as to be driven forward and backward between the in-use state and the retracted state. Specifically, a holder 43 holding the ND filter 40 is rotated about a rotational axis 44, to thereby move the ND filter 40. In FIG. 9, the ND filter and the holder in the in-use state are denoted by reference numerals 40 and 43, respectively, while the ND filter and the holder in the retracted state are denoted by reference numerals 40' and 43', respectively. The holder 43 of FIG. 9 has a portion 43*a* clipped off so as not to reject a light beam passing through an opening portion 41*a* when in the retracted state.

Figure 10A:
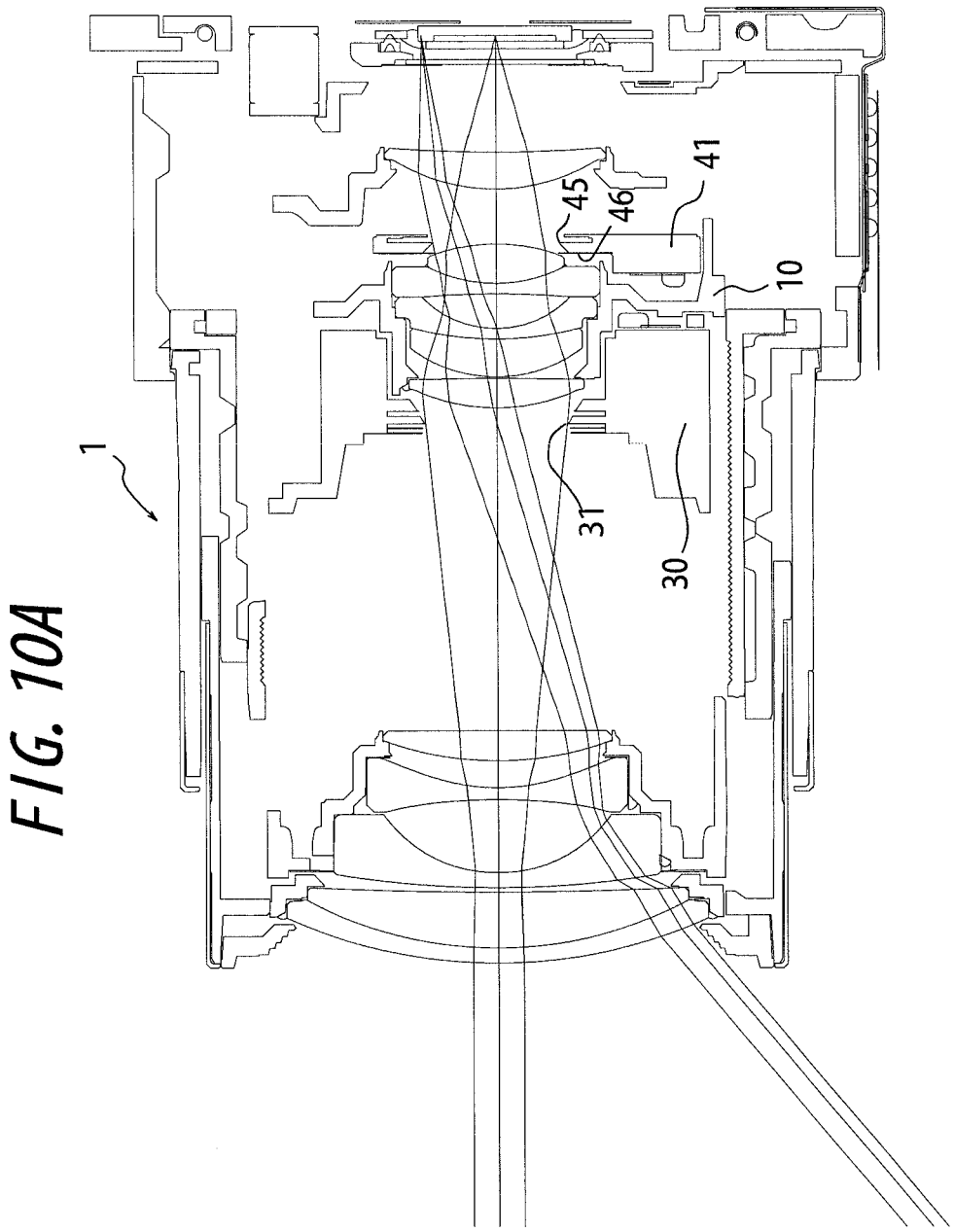
FIG. 10A is a view illustrating a relation between light beams passing through the inside of the image pickup device and stops.
Figure 10B:
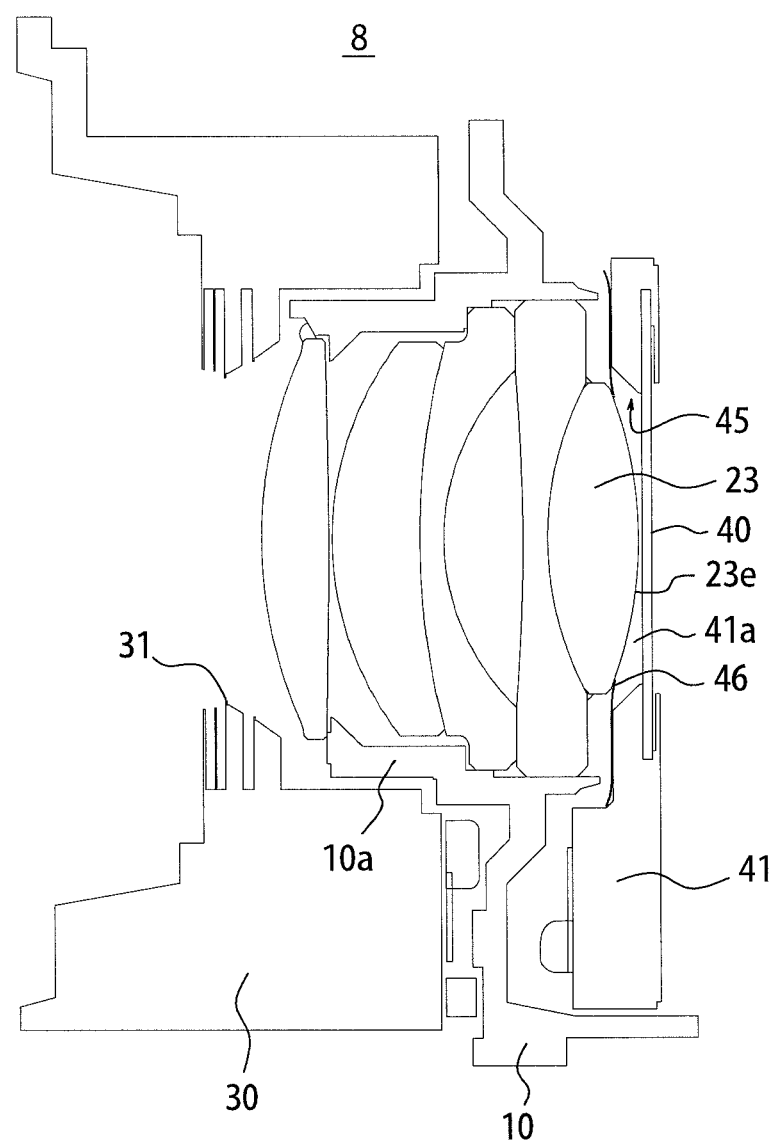
FIG. 10B is an enlarged sectional view illustrating the shutter/third group unit.

FIGS. 10A and 10B are view for illustrating stops of the image pickup device 1. FIG. 10A is a view illustrating a relation between light beams passing through the image pickup device 1 and the stops, and FIG. 10B is an enlarged sectional view illustrating the shutter/third group unit 8. In FIG. 10A, the ND filter 40 is omitted. As illustrated in FIGS. 10A and 10B, the image pickup device 1 includes a brightness stop (aperture stop) 31 disposed in front of the third group lens 10, and flare stops 45 and 46 which are aperture stop members disposed in the ND filter frame 41. The brightness stop 31 serves to control axial light beams. The flare stop 45 serves to control the entrance of ambient light beams. The flare stop 45 is formed of an edge portion on the image side end of the opening portion 41*a* of the ND filter frame 41. The light flux is narrowed by the flare stop 45 before reaching the ND filter 40, so that the ND filter 40 can be reduced in size, which allows the ND filter 40 to be disposed in a smaller space. Normally, the light flux is narrower at a position of the brightness stop 31 anterior to the third group lens 23, as compared to a position posterior to the third group lens 23. In the present invention, as illustrated in FIG. 10A, the flare stop 45 disposed backward of the third group lens 23 controls the entrance of the ambient light beam in part, without limiting the axial light beam. In this manner, the flare stop 45 has an effect of narrowing the light flux at the back of the third group lens 23 while improving the image quality performance in the peripheral part of the formed image. Therefore, the lens barrel 1 is prevented from being increased in entire diameter thereof.

Further, the ND filter frame 41 has, on a surface on the object side, the flare stop 46, which is another aperture stop member. The flare stop 46 is a sheet-like member, and has a circular opening which is smaller than the object side end portion of the opening portion 41a of the ND filter frame 41. The flare stop 46 does not limit effective light beams, and prevents reflected light generated in the lens barrel 1, in particular, in the cemented lens portion or in the third group frame 10, from entering the image sensor to generate flare or ghost.

Further, the flare stop 46 is disposed and held as being in contact with a surface on the image side of the fifth lens of the third group lens 23. With this configuration, no gap is formed between the flare stop 46 and the third group lens 23, so that flare or ghost can be suppressed more efficiently.

Described next is the fourth group frame 13 illustrated in FIGS. 1 to 4, which is a frame member in substantially a disk shape having a circular opening in the center thereof, for holding the fourth group lens 24. The fourth group frame 13 is supported by the focus drive unit 18 so as to be driven forward and backward in the optical axis direction within the fixed frame 2. Further, the focus drive unit 18 is coupled to the fixed frame 2 via an LD main body 19 which is a member for fixing the focus drive unit 18, and the base member 101.

Figure 11:
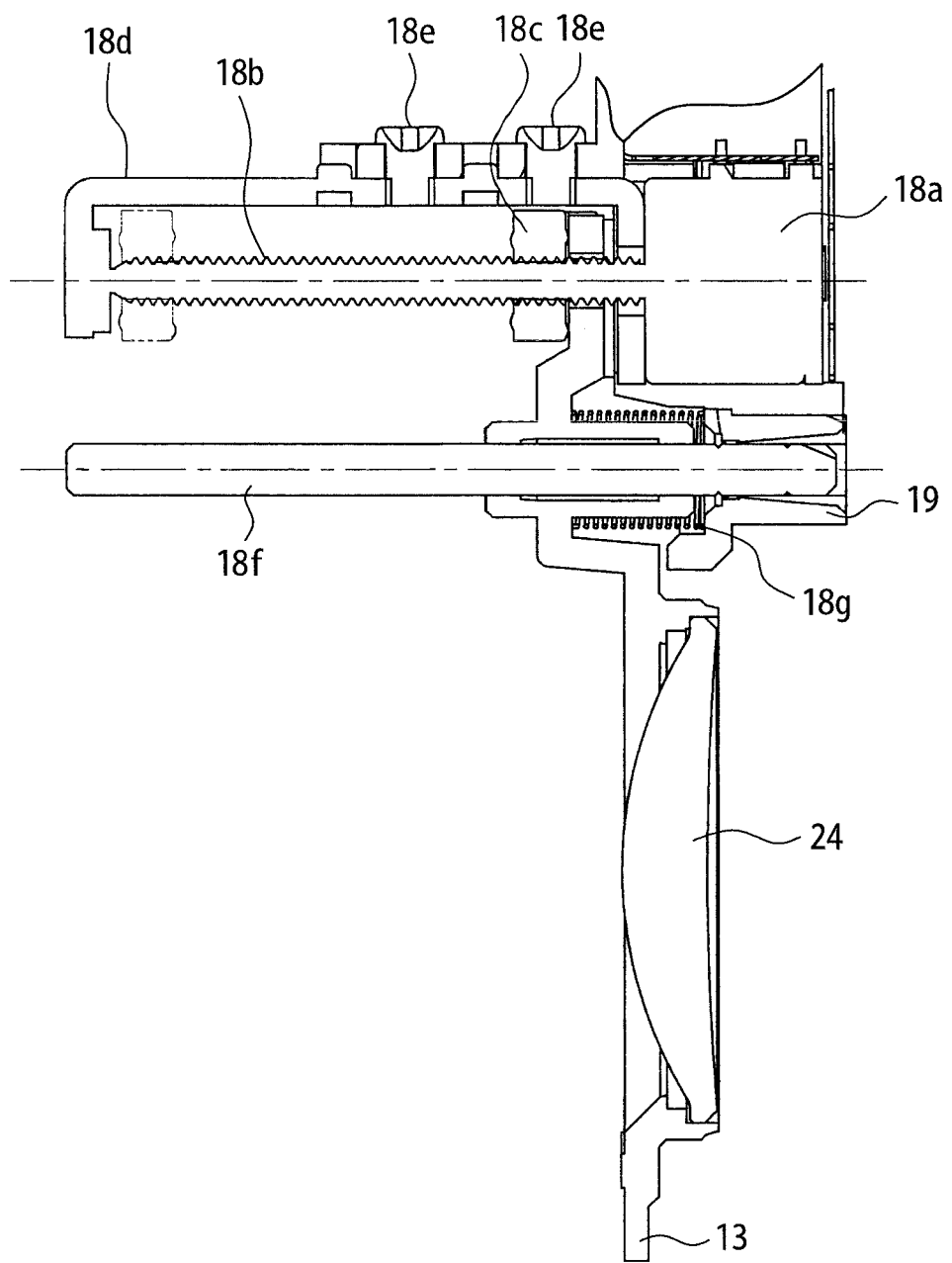
FIG. 11 is a sectional view of a fourth lens group, a fourth group frame, and a focus drive unit of the image pickup unit of FIG. 1.

Next, a mechanism of supporting and driving the fourth group frame 13 by the focus drive unit 18 is described. FIG. 11 is a sectional view of the image pickup unit of FIG. 1 including the fourth group lens 24, the fourth group frame 13, and the focus drive unit 18. FIG. 11 is a sectional view taken along a section simultaneously passing through the central axes of the lead screw 18b and of a focus guide shaft 18f which is to be described later.

The focus motor 18a has a support frame 18d which is integrally formed with a casing of the focus motor 18a. The support frame 18d extends in the optical axis direction from a side of the casing of the focus motor 18a, and has a leading end portion bent to the rotational axis side of the motor. The leading end portion of the support frame 18d rotatably supports the lead screw 18d at a leading end portion thereof, the lead screw being integrally formed with the rotational axis of the focus motor 18a. Therefore, the lead screw 18b is both-end-supported at two points, namely, at the focus motor 18a and at the leading end portion of the support frame 18d. With this configuration, vibrations to be generated along with the rotation of the lead screw 18b can be prevented, so as to make the focus drive unit 18 silent. Further, the support frame 18d has a screw hole formed therein, and is fixed to the LD main body 19 via a focus motor attachment screw 18e.

Further, the nut 18c is threadably mounted on the the lead screw 18b in a rotation restricted state with respect to the support frame 18d. Accordingly, when the focus motor 18a is driven, the lead screw 18b is rotated and the nut 18c moves forward and backward along the lead screw 18b in parallel with the rotation.

Further, the LD main body 19 has the main focus guide shaft 18f inserted therein at a position in proximity to the focus motor 18a, the main focus guide shaft 18f extending in the optical axis direction, and also has a sub focus guide shaft 18h (see FIG. 1) inserted therein at a position spaced apart from the focus motor 18a. The main focus guide shaft 18f and the sub focus guide shaft 18h slidably pass through the fourth group frame 13, which allows the fourth group frame 13 to move in the optical axis direction along the main focus guide shaft 18f and the sub focus guide shaft 18h. Further, the provision of the sub focus guide shaft 18h in addition to the main focus guide shaft 18f prevents the fourth group frame 13 from rotating about the main focus guide shaft 18f.

Further, the lead screw 18b passes through the outer periphery of the fourth group frame 13, between the focus motor 18a and the nut 18c. On the other hand, the main focus guide shaft 18f has a bias spring wound therearound, between the LD main body 19 and the fourth group frame 13 so that the LD main body 19 and the fourth group frame 13 are biased in a direction away from each other. In this manner, the fourth group frame 13 is constantly abutted to a back surface of the nut 18c.

Meanwhile, an FPC board 117 is connected to the LD main body 19 (see FIGS. 2 to 4). The FPC board 117 includes a drive signal line to the focus motor 18a for focus drive and an origin point detection signal line to a control circuit of the image pickup device.

With this configuration, when the lead screw 18b is rotated by a drive force generated by the focus motor 18a of the focus drive unit 18, the nut 18c is driven forward and backward along the lead screw 18b. When the nut 18c is driven forward and backward, the fourth group frame 13 abutted to the back surface of the nut 18c is driven forward and backward in a direction along the focus guide shafts 18f, 18h, that is, in a direction along the optical axis O, so as to be adjusted to an appropriate focusing position in the photographable state and to be positioned to a predetermined retracted position during the retracting operation.

In FIG. 11, the focus motor 18a, a posterior end portion of the main focus guide shaft 18f, and a part of the LD main body 19 fitted with the focus motor 18a and the posterior end portion of the main focus guide shaft 18f project further backward than a lens surface on the backside (image side) of the fourth group lens 24 in the retracted position. As will be described later, these portions are arranged so as to pass through an image blur correction device 105. On the other hand, the sub focus guide shaft 18h does not pass through the image blur correction device 105.

Next, a lens configuration of the photographing optical system is described.

Figure 12:
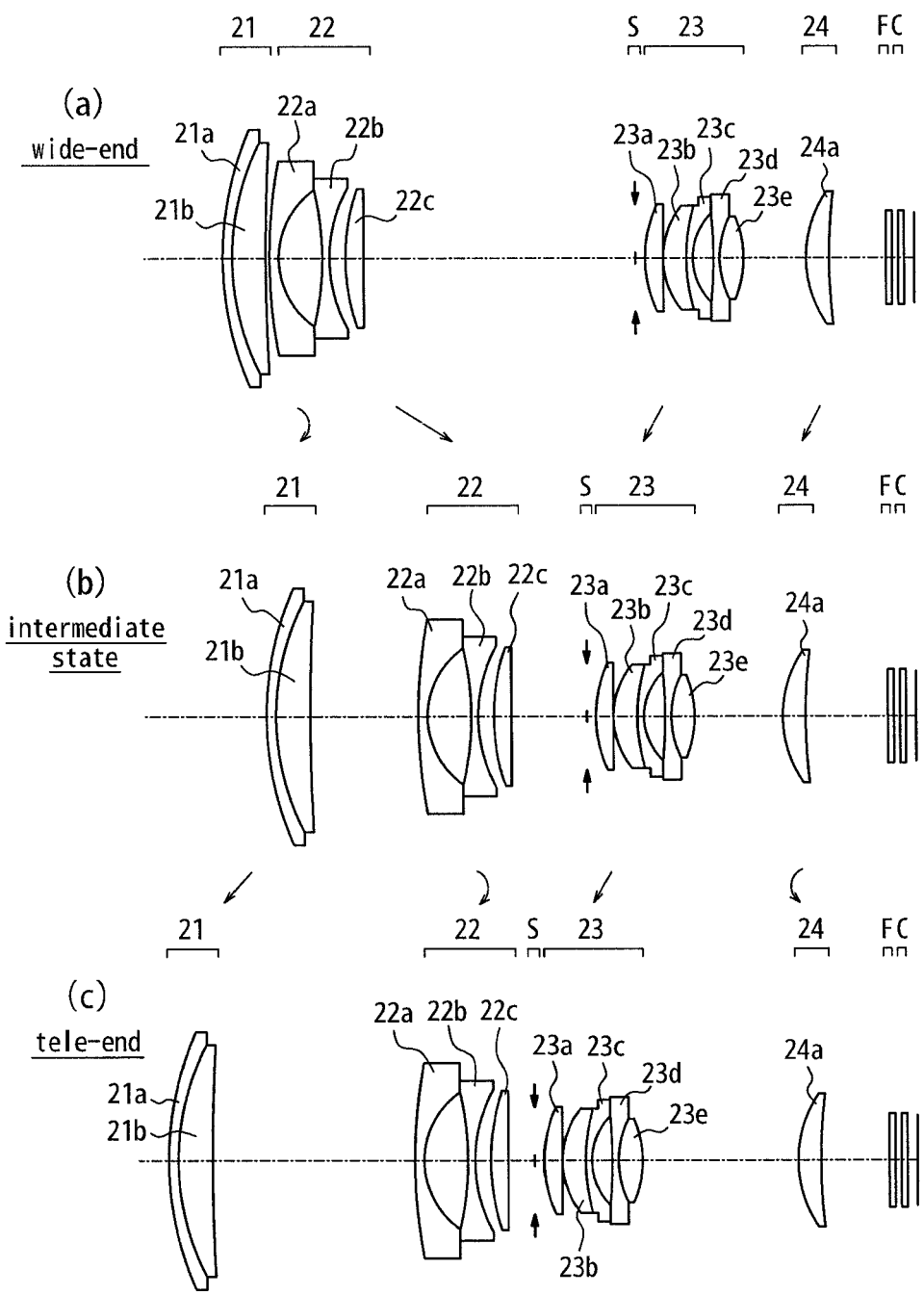
FIG. 12 is a lens sectional view of the image pickup unit of FIG. 1 at a wide-end (a), in an intermediate state (b), and at a tele-end (c)

FIG. 12 is a lens sectional view of the image pickup unit of FIG. 1 at the wide-end (a), in an intermediate state (b), and at the tele-end (c). As described above, the image pickup device according to this embodiment includes, as a photographing optical system, the first group lens 21, the second group lens 22, the third group lens 23, and the fourth group lens 24, which are arranged in this order from the object side. Here, the first group lens 21 has a positive refractive power, the second group lens 22 has a negative refractive power, and the third group lens 23 and the fourth group lens 24 each have a positive refractive power. In FIG. 12, reference symbols S, F, and C each denote a brightness stop, a low-pass filter 118 coated with infrared cut coating, and a transparent cover member positioned in front of the imaging area of the image sensor, respectively.

As illustrated in detail in FIG. 12, lenses in each group are configured, for example, as described below. The first group lens 21 having a positive refractive power is formed of a cemented lens including, in order from the object side, a negative meniscus lens 21a having a convex surface facing to the object side and a positive meniscus lens 21b having a convex surface facing to the object side. The second group lens 22 having a negative refractive power includes, in order from the object side, a negative meniscus lens 22a having a convex surface facing to the object side, a biconcave negative lens 22b, and a biconvex positive lens 22c. The third group lens 23 having a positive refractive power includes, in order from the object side, a biconvex positive lens (first lens) 23a, a cemented lens formed of a positive meniscus lens (second lens) 23b having a convex surface facing to the object side and a negative meniscus lens (third lens) 23c having a convex surface facing to the object side, and a cemented lens formed of a biconcave negative lens (fourth lens) 23d and a biconvex positive lens (fifth lens) 23e. Further, the fourth group lens 24 having a positive refractive power includes a positive meniscus lens 24a having a convex surface facing to the object side.

Six surfaces including both surfaces of the biconcave negative lens 22b of the second group lens 22, both surfaces of the biconvex positive lens 23a on the object side and a surface on the image side of the biconvex positive lens 23c on the image side of the third group lens 23, and a surface on the object side of the positive meniscus lens 24a having a convex surface facing to the object side of the fourth group lens 24 are formed aspherical.

Then, in varying magnification from the wide-end as a short-focal position to the tele-end as a long-focal position, the first group lens 21 first moves to the image side, and then moves in a reverse direction between the wide-end and the intermediate focal length state so as to move to the object side. The first group lens 21 is positioned closer to the object side at the tele-end, rather than at the wide-end. The second group lens 22 first moves to the image side, and then moves in a reverse direction between the intermediate focal length state and the tele-end so as to move to the object side. The second group lens 22 is positioned closer to the image side at the tele-end, rather than at the wide-end. The third group lens 23 moves only to the object side. The fourth group lens 24 first moves to the object side, and then moves in a reverse direction between the intermediate focal length state and the tele-end so as to move to the image side. The fourth group lens 24 is positioned closer to the object side at the tele-end, rather than at the wide-end.

It should be noted that the above-mentioned lens configurations are merely examples, and various lens configurations can be adopted as long as the first group lens 21 has a positive refractive power, the second group lens 22 has a negative refractive power, the third group lens 23 has a positive refractive power, and the fourth group lens 24 has a positive refractive power. Therefore, the second group lens 22 may be formed of, for example, two lenses including a second group object side lens and a second group image side lens. Alternatively, the positive fourth group lens 24 may have a negative lens bonded thereto so as to be configured as an achromatic lens. Further, a single negative lens (which is in a concave shape with respect to the image side, with the radius of curvature of the image-side lens being smaller than the radius of curvature of the object-side lens) may be interposed between the positive third group lens and the positive fourth group lens, and this negative lens and the fourth group lens may be adapted to move independently of each other in the optical axis direction.

In the lens barrel 1 for holding the above-mentioned photographing optical system, the fixed frame 2 is positioned to the base member 101 of the sensor unit 100 across the LD main body 19, and fixed via a screw. As a result, the lens barrel 1 and the sensor unit 100 are coupled to each other, to thereby form an image pickup unit.

Figure 13:
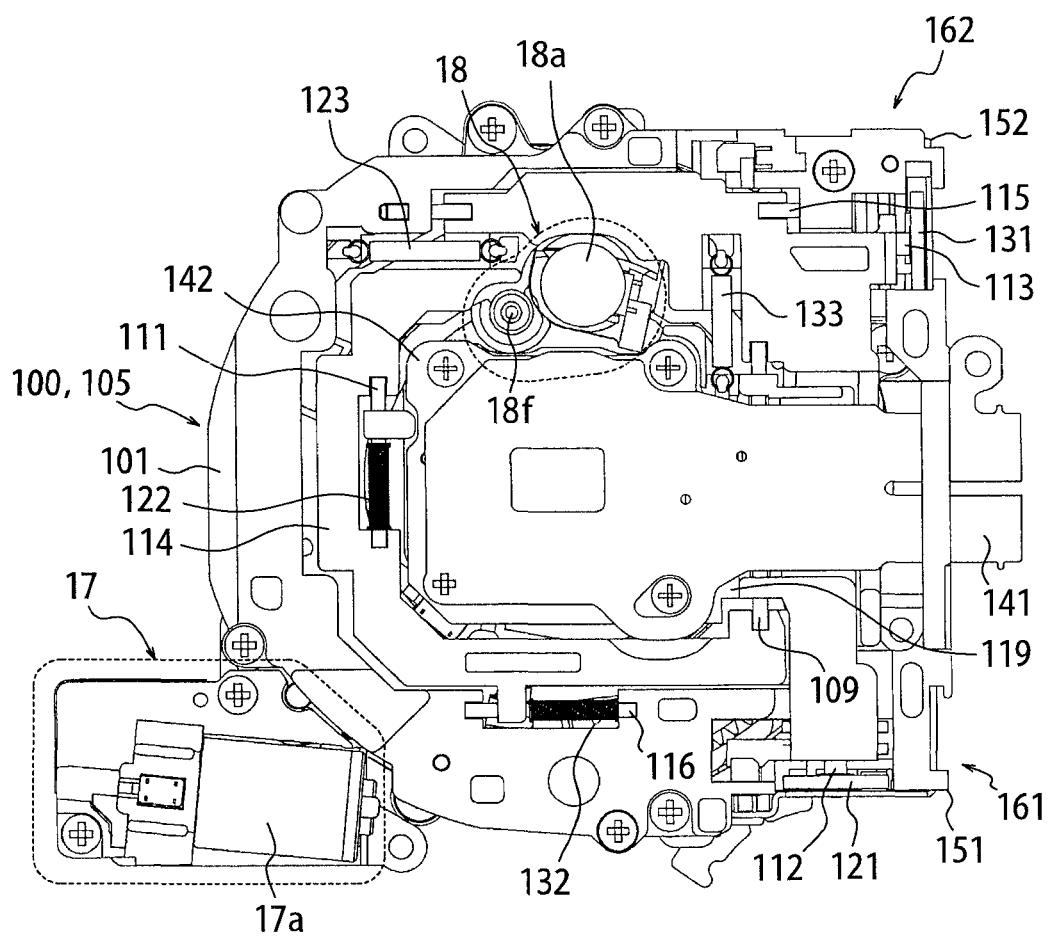
FIG. 13 is a back view of the image pickup unit of FIG. 1.

Next, with reference to FIG. 13, a configuration of the sensor unit 100 is described.

The sensor unit 100 has the image blur correction device 105 for correcting image blur and an image sensor 110 for generating image data. The image blur correction device 105 includes: the base member 101; Y guide shafts 109, 110 and a Y feed screw 112 that extend in a Y direction (first direction) and supported by the base member 101; an X feed screw 113 that extends in an X direction (second direction) and supported; a slider 114 supported by the Y guide shaft 111 and the Y feed screw 112 so as to be movable in the Y direction; X guide shafts 115, 116 that extends in the X direction and supported by the slider 114; a sensor holding frame 119 supported by the X feed screw 113 and the X guide shafts 115, 116 so as to be slidable in the X direction, the optical low-pass filter 118 (see FIGS. 2 to 4) and the image sensor 110 (see FIGS. 1 to 4) attached to the sensor holding frame 119; and a Y motor (first motor) 120 and an X motor (second motor) 130 (see FIG. 1) supported by the base member 101 (see FIG. 1).

The X direction and the Y direction are orthogonal to each other, and also orthogonal to the optical axis O. The X direction and the Y direction each extend along a lateral direction (X direction) and a longitudinal direction (Y direction), respectively, of the image sensor 110.

The Y motor 120 is a stepping motor for rotating the Y feed screw 112 via a gear train 121 so as to drive the slider 114 in the Y direction. Further, the X motor 130 is a stepping motor for rotating the X feed screw 113 via a gear train 131 so as to drive the sensor holding frame 119 in the X direction. The Y motor 120 and the X motor 130 are driven via an FPC (not shown) connected thereto, the FPC being connected to a base circuit board. In this manner, the sensor holding frame 119 is driven by the Y motor 120 and the X motor 130, along a surface parallel to a light receiving surface of the image sensor 110, to thereby correct image blur of an optical image formed on the image sensor 110 via the lens barrel 1.

The Y guide shaft 111 and the X guide shaft 116 each have compressed coil springs 122, 132 wound therearound, respectively. Further, tension coil springs 123, 133 are suspended between the base member 101 and the slider 114 and between the base member 101 and the sensor holding frame 119. With this configuration, the slider 114 and the sensor holding frame 119 are each biased to the origin position.

The image sensor 110 is connected to the FPC 141, and mounted to the sensor holding frame 119. On the rear surface side of the image sensor 110, a heatsink 142 is attached to the sensor holding frame 119, with the FPC 141 being interposed therebetween.

Here, when viewed from the lens barrel 1 side, the base member 101 of the image blur correction device 105 is in a projection shape schematically represented by a combination of a semicircle and a rectangle that are combined in such a manner that the straight section of the semicircle is aligned with one side of the rectangle. A first drive portion 161 including the Y motor 120 and the gear train 121 is mounted on a first corner 151, which is one of the two corners of the rectangular part, and a second drive portion 162 including the X motor 130 and the gear train 131 is mounted on a second corner 152, which is the other corner of the rectangular part.

Further, the circular arch of the semicircular part of the base member 101 extends along the circumference of the posterior end portion of the fixed frame 2, and the zoom drive unit 17 is disposed on the outside of the base member 101 opposite to the second corner 152 across the optical axis O, that is, on the outside of the fixed frame 2. The zoom motor 17a of the zoom drive unit 17 is connected, via the gear train 17b, to the long gear 17c in the gear storage portion 2d of the fixed frame 2 (see FIG. 1).

The focus drive unit 18 is disposed inside the fixed frame 2, in a position that does not cause interference with the optical system. The slider 114 has a cutout portion formed therein so as to allow the posterior end of the focus motor 18a fixed to the LD main body 19 to project through the slider 114 in the image blur correction unit 105, with the motor shaft being directed forward. Further, the posterior end of the main focus guide shaft 18f also passes through the slider 114 of the image blur correction device 105 as being fixed to the LD main body 19. Here, a cutout portion is formed between the heatsink 142 and the slider 114 so as to have an opening when viewed in a direction along the optical axis, so that the focus motor 18*a* and the main focus guide shaft 18*f* pass through the cutout portion in a direction along the optical axis, inside the sensor unit 100. In other words, the focus motor 18*a* and the main focus guide shaft 18*f* pass through a gap between the slider 114 and the sensor holding frame 119. Further, the focus motor 18*a* and the main focus guide shaft 18*f* are disposed across a clearance formed with respect to the heatsink 142 and the slider 114, so that the heatsink 142 and the slider 114 can move in the X direction and/or in the Y direction during the image blur correction, without coming into contact with the focus motor 18*a* and the main focus guide shaft 18*f*. This configuration allows the outer diameter of the fixed frame 2 to be miniaturized. Accordingly, a flash lamp and a tripod screw can be arranged further closer to the fixed frame, which leads to a reduction in size of the image pickup device. Further, when assembling the lens barrel 1 and the sensor unit 100, the focus drive unit 18 and the image blur correction device 105 do not interfere with each other, and the positions of the focus motor 18*a* and the main focus guide shaft 18*f* can be visually identified from behind the image blur correction device 105, which makes the assembling easy.

The FPC 141 connected to the image sensor 110 extends in the X direction from the image sensor 110 on the rear side of the base member 101. The FPC 141 is connected to the base circuit board, so that an image picked up by the image sensor 110 is displayed on a display device such as a liquid crystal panel (not shown) and recorded on a recording medium.

In the following, description is given of an operation of the image pickup device according to this embodiment configured as described above.

First, during zoom adjustment upon start-up, when the lens barrel 1 is brought into the photographable state from the retracted state through clockwise rotation of the cam frame 5, that is, when the cam frame 5 is positioned at the forward movement end so as to be located at the wide-end serving as a short-focal position, each frame member moves forward in a direction along the optical axis O as illustrated in FIG. 3, so that the lens barrel 1 is elongated as a whole. At the wide-end, the second group frame 11 and the shutter/third group unit 8 are arranged at positions spaced apart from each other.

From the wide-end, a rotary frame 3 is further rotated clockwise at the forward movement end. Along with the rotation, the first group lens 21 first moves to the object side and then moves to the image side, the second group lens 22 first moves to the image side and then moves to the object side, the third group lens 23 moves to the object side, and the fourth group lens 24 first moves to the object side and the moves to the image side, so as to perform magnification varying operation. Then, at the tele-end serving as the long-focal position where the lens barrel 1 has been drawn out to a maximum extent, the second group lens 22 and the third group lens 23 are arranged in proximity to each other as illustrated in FIG. 4.

Further, during focus adjustment, the focus drive unit 18 is driven so as to drive the fourth group frame 13 forward and backward in the optical axis direction, to thereby adjust the position of the fourth group lens 24 in the optical axis direction. In this manner, a focus-adjusted image can be obtained at a desired image magnification.

Further, during image taking, a sensor such as an angular velocity sensor (not shown) is used to detect a camera shake direction, and the first drive portion 161 and the second drive portion 162 of the image blur correction device 105 are driven so as to drive the sensor holding frame 119 in a direction opposite to the camera shake direction, to thereby correct image blur. At this time, the focus motor 18*a* and the main focus guide shaft 18*f*, which pass through the image blur correction device 105, do not hinder the image blur correction because the focus motor 18*a* and the focus guide axis 18*f* have a clearance formed with respect to the image blur correction device 105, when viewed in the optical axis direction.

Further, the focus motor 18*a* and the main focus guide shaft 18*f* pass through the gap between the slider 114 and the sensor holding frame 119 of the image blur correction device 105, and hence the focus motor 18*a* and the main focus guide shaft 18*f* can be arranged without the need to avoid a position on the back side of a position where the image blur correction device 105 is disposed. Accordingly, the fixed frame 2 can be reduced in diameter. As a result, a flash lamp and a tripod screw can be arranged in proximity to the fixed frame 2 of the image pickup device main body, which allows the entire device to be miniaturized.

Further, when the photographable state is terminated as in such a case where the image pickup device is turned off, the cam frame 5 of the lens barrel 1 is rotated counterclockwise, and each frame member moves backward along the optical axis O, along with the rotation of the cam frame 5, so as to be in the retracted state of FIG. 2. At this time, the focus motor 18*a* and the main focus guide shaft 18*f* are stored making effective use of a dead space formed inside the lens barrel 1 behind the the first group lens 21 that has a largest diameter. In this retracted state, part of the second group frame 11 is fitted inside the shutter frame 30, and part of the second group lens 22 on the image side is stored on the inner peripheral side inside the shutter frame 30.

As described above, according to this embodiment, the third group lens 23 is formed of five lenses including two negative lenses, and the third group frame 10 is constantly fixed to the shutter frame 30 in such a manner that at least part on the object side of the third group lens 23 is arranged on the inner peripheral side of the shutter frame 30. In the retracted state, part of the second group frame 11 on the image side is fitted inside the shutter frame 30 and at least part on the image side of the second group lens 22 is stored on the inner peripheral side of the shutter frame 30. As a result, aberration can be excellently corrected in the third group lens 23, and the device can be reduced in size in the retracted state.

Further, in the third group lens 23, the second lens 23*b* and the third lens 23*c* are cemented to each other across opposing surfaces so as to form a cemented lens, and the fourth lens 23*d* and the fifth lens 23*e* are cemented across opposing surfaces so as to form a cemented lens, so that the third group lens 23 as a whole can be reduced in thickness, which allows the lens barrel 1 to be further miniaturized as a whole.

Further, in the third group lens 23, the fourth lens 23*d* is larger in diameter than the fifth lens 23*e*, and the fourth lens 23*d* is held by the third group frame 10 while the fifth lens 23*e* is held by the fourth lens 23*d* as being cemented thereto. Accordingly, the third group frame 10 does not protrude on the image side, with respect to the fifth lens 23*e*, and hence does not interfere with the ND filter 40 on the image side of the third group frame 10, which allows the lens barrel 1 to be further miniaturized as a whole.

Further, the ND filter 40 is disposed on the image side of the third group lens 23 where the effective pencil of rays is narrow, which makes the device configuration easy because the ND filter and other drive mechanisms are not closely arranged inside the shutter frame. Further, the ND filter 40 is arranged closer to the shutter frame 30, and hence a smaller ND filter can be employed as compared to a case where the ND filter 40 is arranged at another position, which contributes to the miniaturization of the lens barrel 1. Further, the ND filter frame 41 is provided with an aperture stop member, which makes it possible to further reduce to the diameter of the ND filter 40.

Further, the lens barrel 1 has the guide frame 7 that slidably moves from the fixed frame 2 along the inner periphery of the fixed frame 2 and a first group frame 12 that slidably moves along the guide frame 7, and the first group frame 12, the second group frame 11, and the third group frame 10 all directly engage with the cam frame 5 and are adapted to move in the optical axis direction through the rotation of the cam frame 5, to thereby enable movement with no backlash.

Further, at the tele-end position, the second group lens 22 and the third group lens 23 come close to each other, and hence the entire length of the lens barrel 1 can be reduced, to thereby allow the image pickup device to be further reduced in thickness. Further, the coil spring 35 is interposed between the second group frame 11 and the shutter/third group unit 8 so as to bias the second group frame 11 and the shutter/third group unit 8 in a direction away from each other. Accordingly, even if the second group lens 22 first moves to the object side and then moves to the image side via an inflection point, the second group lens 22 can be smoothly moved forward and backward without no backlash.

Further, according to this embodiment, the lens barrel 1 includes the fourth group lens 24 serving as a focusing lens and the focus drive unit 18 for driving the fourth group lens 24 forward and backward along the optical axis, in which the focus motor 18a and the main focus guide shaft 18f which are part of the focus drive unit 18 pass through the slider 114 of the image blur correction device 105 without interfering with the slider 114 of the image blur correction device 105. As a result, the diameter of the fixed frame 2 can be reduced, to thereby miniaturize the device main body.

Figure 15A:
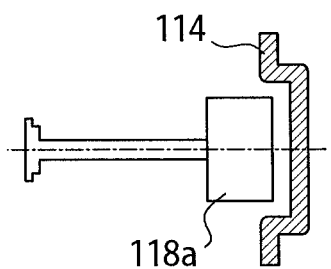
FIG. 15A is an exemplary sectional view of a focus motor and a slider.
Figure 15B:
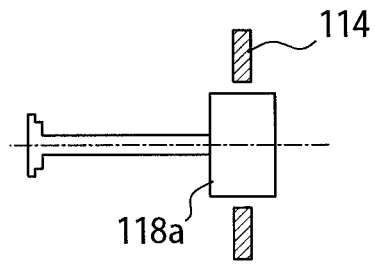
FIG. 15B is another exemplary sectional view of the focus motor and the slider.
Figure 15C:
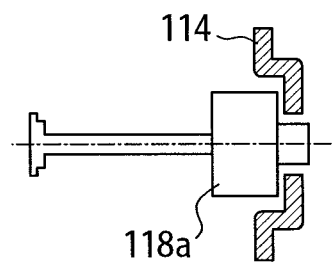
FIG. 15C is further another exemplary sectional view of the focus motor and the slider.

It should be noted that a cutout portion may be formed in the slider 114 of the image blur correction device 105, so that other components of the focus drive unit 18 such as a sub guide shaft 18h, as well as the focus motor 18a and the main focus guide shaft 18f, may be adapted to pass through the cutout. Alternatively, only one of the focus motor 18a and the main focus guide shaft 18f may be adapted to pass through a through hole formed in part of the slider 114 of the image blur correction device 105 (see FIG. 15B or 15C). In particular, since the focus motor 18a, which is a relatively large member, passes through the image blur correction device 105, the lenses and the lens frames can be arranged with ease in the retracted state, which enables the miniaturization of the image pickup device 1. Further, the image blur correction device 105 may have a depression (concave portion) formed in a surface (for example, part of the slider 114) opposing to the focus motor 18a or part of the LD main body 19, so as to form a clearance with respect to a side surface on the image side of the focus motor 18a (see FIG. 15A). Alternatively, the image blur correction device 105 may have a depression (concave portion) formed in a surface (for example, part of the slider 114) opposing to part of the LD main body 19, and a small opening hole may be formed in part of the depression, so that the rotation axis of the focus motor 18a or an end portion of the main focus guide shaft 18f passes through the small hole (see FIG. 15C). Even in this case, part of the focus drive unit 18 falls inside the image blur correction device 105, which enables the miniaturization of the lens barrel 1 and the image pickup device. A cutout formed in a relief shape in a direction orthogonal to the optical axis, a concave portion formed in a concave shape (depression) in the optical axis direction, and a through hole formed in a relief hole in the optical axis direction for allowing part of the focus drive unit to pass therethrough are collectively referred to as cutout portions.

Further, the focus motor 18a and the main focus guide shaft 18f pass through, with respect to the optical axis direction, on the outside of the moving region of the sensor holding frame 119, within a region of the slider 114 of the image blur correction device 105, which allows the focus drive unit 18 to be arranged at a position closer to the image sensor 110. Therefore, the lens barrel 1 and the image pickup device can be further miniaturized as a whole.

It should be noted that the present invention is not limited to the above-mentioned embodiment, and may be subjected to various modifications and alterations without departing from the gist of the present invention. For example, the lens barrel of the present invention is not limited to a sensor unit having a CCD, and may be coupled to a sensor unit having a CMOS so as to form an image pickup device, or may be applied to a camera using a silver halide film. Further, the X motor and the Y motor of the image blur correction device may also employ a voice coil motor (VCM), other than the stepping motor.

Further, the number of stages it takes to draw out the lens barrel (the number of the lens barrel) is not limited to two stages including, namely, the guide frame and the first group frame, and may be configured to have three stages or four stages. For example, in a lens barrel configured to have three stages, the cam frame is drawn out from the object side together with the lens barrel at the second stage, and the cam frame is provided with cam grooves corresponding to the first group frame, the second group frame, and the third group frame so that the first group frame, the second group frame, and the third group frame are each caused to move in the optical axis direction through the rotation of the cam frame. Alternatively, rather than engaging all the three frames including the first group frame, the second group frame, and the third group frame to a single cam frame, another cam frame that extends in the optical direction together with the lens barrel at the third stage may be additionally provided so that part of the lens frame may be caused to move in the optical direction through the rotation of the additional cam frame.

In the third group lens, the fourth lens is larger in diameter than the fifth lens, the fourth lens is held by the third frame, and the fifth lens is held by the fourth lens as being cemented thereto. However, the fourth lens and the fifth lens may not be cemented and held as described above, as long as the thickness of the third group frame can be configured to fall within a desired range.

Figure 14:
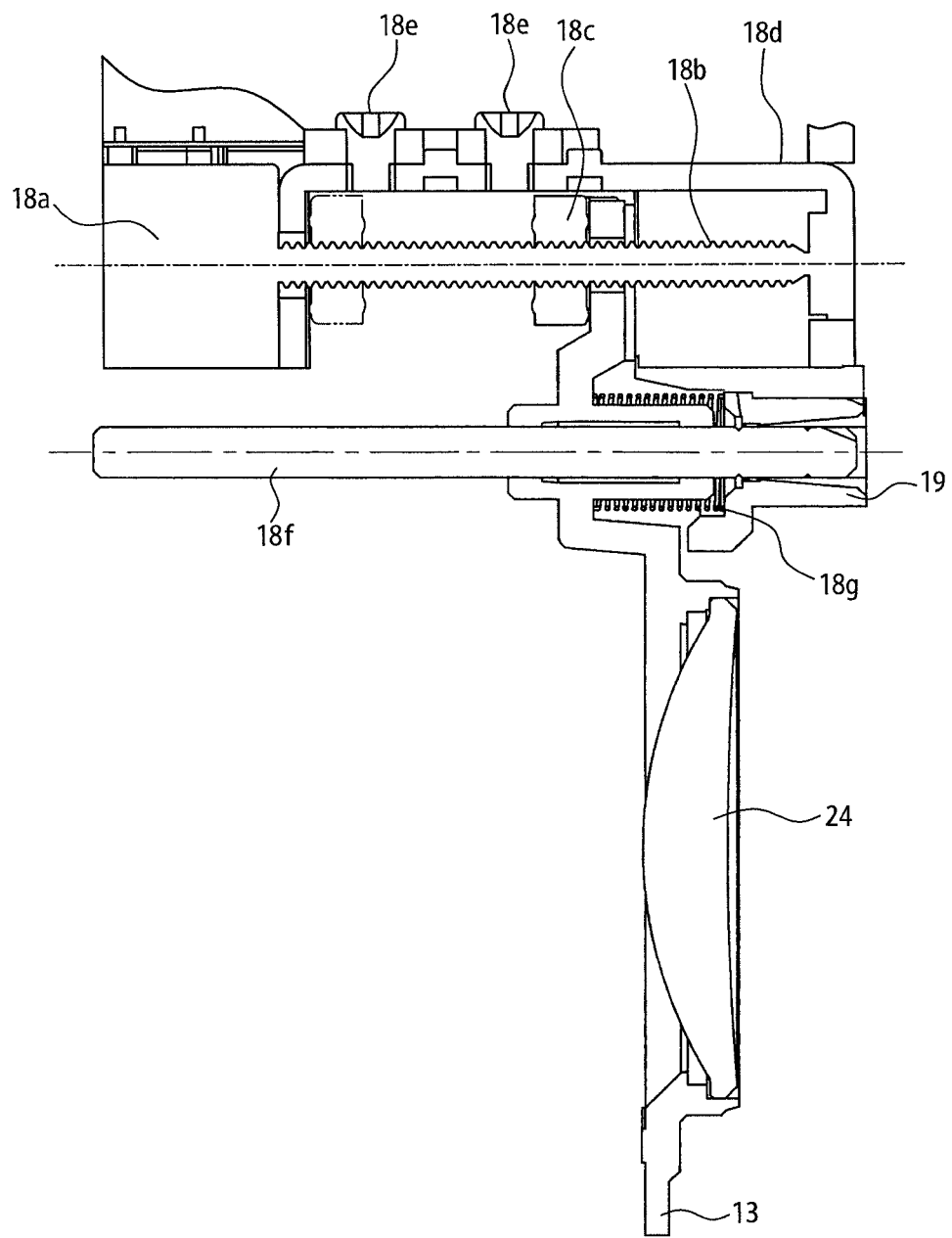
FIG. 14 is a sectional view of a fourth group lens, a fourth group frame, and a focus drive unit of an image pickup unit according to a modified example of the present invention.

Further, the focus drive unit is not limited to the configuration in which part of the focus motor passes through the image blur correction device, and may also be configured, for example, as illustrated in FIG. 14, to have the focus motor 18a, the lead screw 18b, and the support frame 18d arranged in a reversed order in an anteroposterior direction, so that the leading end portion of the support frame 18d passes through a cutout formed in part of the slider of the image blur correction device. Further, the focus drive unit may be configured to be movable in the optical axis direction, with respect to the image blur correction device. In this case, part of the focus drive unit is supposed to pass through the image blur correction device when the lens barrel is in a predetermined state, for example, in the retracted state. When the focus drive unit is configured as illustrated in FIG. 14, the displacement of the movable part of the image blur correction device can be least hindered because the support frame is likely to be smaller than the focus motor. Further, the displacement of the movable part of the image blur correction device is not hindered when the camera is in the in-use state, and hence the displacement of the focus drive unit and the image blur correction device can be ensured, with the result that the lens mechanism can be further miniaturized.

The above-mentioned lens barrel of the present invention is capable of attaining an object of the present invention described below, other than those described in the scope of claims.

(1) The lens barrel according to claim 1, in which the third group lens includes, in order from the object side to the image side, a first lens as a biconvex positive lens; a second lens as a positive lens having a convex surface facing to the object side, a third lens as a negative lens having a convex surface facing to the object side, a fourth lens as a biconcave negative lens, and a fifth lens as a biconvex positive lens, the second lens and the third lens forming a cemented lens, the fourth lens and the fifth lens forming the cemented lens.

DESCRIPTION OF SYMBOLS 1 lens barrel
2 fixed frame
5 cam frame
6 float key
7 guide frame
8 shutter/third group unit
10 third group frame
11 second group frame
12 first group frame
13 fourth group frame
17 zoom drive unit
18 focus drive unit
18a focus motor
18f main focus guide shaft
19 LD main body
21 first group lens
22 second group lens
23 third group lens
24 fourth group lens
30 shutter frame
31 brightness stop (aperture stop)
35 coil spring
40 ND filter
41 ND filter frame
45, 46 flare stop
100 sensor unit
101 base member
105 image blur correction device
110 image sensor
114 slider
115 sensor holding frame
117 FPC
119 sensor holding frame
120 Y motor (first motor)
130 X motor (second motor)
161 first drive portion
162 second drive portion
O optical axis

The invention claimed is:
1. A lens barrel, comprising:
  a fixed frame of the lens barrel, the lens barrel at least having, in order from an object side to an image side, a first group lens having a positive refractive power, a second group lens having a negative refractive power, and a third group lens having a positive refractive power;
  a cam frame supported by the fixed frame so as to be rotationally movable in a photographing optical axis direction between a forward movement end and a backward movement end which are each defined in the photographing optical axis direction;
  a guide frame which moves in a rotation restricted state together with the cam frame, in the photographing optical axis direction;
  a shutter frame which holds a shutter and moves in the photographing optical axis direction in a rotation restricted state, through the rotation of the cam frame;
  a first group frame which holds the first group lens, fits in an inner periphery of the guide frame, and moves in the photographing optical axis direction in the rotation restricted state, through the rotation of the cam frame;
  a second group frame which holds the second group lens, moves in the photographing optical axis direction in a rotation restricted state, through the rotation of the cam frame, and, upon the cam frame being positioned at the backward movement end, fits in, at least in part thereof on the image side, an inner peripheral side of the shutter frame;
  a third group frame which holds the third group lens formed of five lenses including two negative lenses, and fixed as fitting, at least in part thereof on the object side, in the inner peripheral side of the shutter frame;
  an ND filter which is provided to the third group frame, on the image side of the third group lens; and
  an ND filter frame disposed on the image side of the third group frame,
  wherein, in the third group lens, at least part of a lens surface on the image side of the fifth lens cemented to and held by the fourth lens falls inside the ND filter frame when viewed from a direction orthogonal to the photographing optical axis.

2. The lens barrel according to claim 1, further comprising, between the third group lens and an image surface, a fourth group lens having a positive refractive power;
  wherein the third group lens includes, in order from the object side to the image side, a first lens as a positive lens, a second lens as a positive lens, a third lens as a negative lens, a fourth lens as a negative lens, and a fifth lens as a positive lens, the second lens and the third lens forming a cemented lens, the fourth lens and the fifth lens forming a cemented lens.

3. The lens barrel according to claim 2,
  wherein the fourth lens is larger in diameter than the firth lens;
  wherein the fourth lens is held by the third group frame; and
  wherein the fifth lens is held by the fourth lens as being cemented thereto.

4. The lens barrel according to claim 1, wherein, at least in a retracted state, at least part of the ND filter frame falls inside the fourth group frame when viewed from a direction orthogonal to the photographing optical axis.

5. The lens barrel according to claim 1, wherein the ND filter frame is provided with an aperture stop member.

6. The lens barrel according to claim 1, wherein the ND filter frame is provided with a plurality of aperture stop members.

7. The lens barrel according to claim 6, wherein one of the plurality of aperture stop members is arranged in contact with the fifth lens of the third group lens.

8. The lens barrel according to claim 1,
wherein the shutter frame and the ND filter frame are each arranged on the object side and the image side of the third group frame, respectively; and
wherein at least one of the shutter frame and the ND filter frame is fixed to the third group frame using a through hole formed in the third group frame.

9. The lens barrel according to claim 8,
wherein the third group frame has a screw hole portion formed therein; and
wherein another one of the shutter frame and the ND filter frame that is not fixed using the through hole is fixed to the third group frame using a single screw to be threaded into the screw hole portion.

10. The lens barrel according to claim 1, wherein the first group frame, the second group frame, and the third group frame are directly engaged with the cam frame.

11. The lens barrel according to claim 1, further comprising an ND filter drive mechanism which moves the ND filter between an in-use state in which the ND filter is arranged in a light path, and a retracted state in which the ND filter is arranged out of the light path.

12. An image pickup device, comprising:
a lens barrel including
  a fixed frame of the lens barrel, the lens barrel at least having, in order from an object side to an image side, a first group lens having a positive refractive power, a second group lens having a negative refractive power, and a third group lens having a positive refractive power,
  a cam frame supported by the fixed frame so as to be rotationally movable in a photographing optical axis direction between a forward movement end and a backward movement end which are each defined in the photographing optical axis direction,
  a guide frame which moves in a rotation restricted state together with the cam frame, in the photographing optical axis direction,
  a shutter frame which holds a shutter and moves in the photographing optical axis direction in a rotation restricted state, through the rotation of the cam frame,
  a first group frame which holds the first group lens, fits in an inner periphery of the guide frame, and moves in the photographing optical axis direction in the rotation restricted state, through the rotation of the cam frame,
  a second group frame which holds the second group lens, moves in the photographing optical axis direction in a rotation restricted state, through the rotation of the cam frame, and, upon the cam frame being positioned at the backward movement end, fits in, at least in part thereof on the image side, an inner peripheral side of the shutter frame,
  a third group frame which holds the third group lens formed of five lenses including two negative lenses, and fixed as fitting, at least in part thereof on the object side, in the inner peripheral side of the shutter frame,
  an ND filter which is provided to the third group frame, on the image side of the third group lens, and
  an ND filter frame disposed on the image side of the third group frame,
  wherein, in the third group lens, at least part of a lens surface on the image side of the fifth lens cemented to and held by the fourth lens falls inside the ND filter frame when viewed from a direction orthogonal to the photographing optical axis;
an image sensor for forming image data upon reception of an optical image formed through the first group lens, the second group lens, the third group lens, and the fourth group lens; and
an image blur correction device for performing an image blur correction operation by displacing the image sensor in a plane parallel to a light receiving surface of the image sensor.

13. The image pickup device according to claim 12,
wherein the lens barrel includes a focus drive unit for driving the fourth group lens forward and backward along an optical axis; and
wherein a movable part of the image blur correction device has a cutout portion formed therein so as to avoid interference being caused between part of the focus drive unit and the image blur correction device.

14. The image pickup device according to claim 13,
wherein the focus drive unit is provided with a focus motor serving as a drive source of the fourth group lens; and
wherein the movable part of the image blur correction device has a cutout portion formed therein so as to avoid interference being caused between part of the focus motor and the image blur correction device.

15. The image pickup device according to claim 13,
wherein the image blur correction device includes: a base member having the lens barrel fixed thereto;
a slider supported by the base member so as to be movable in a first direction orthogonal to the optical axis; and
a sensor holding frame for holding the image sensor supported by the slider so as to be movable in a second direction orthogonal to the optical axis and to the first direction; and
wherein part of the focus drive unit has a cutout portion on the outside of a moving region of the sensor holding frame within a region of the slider, with respect to the optical axis direction.

\* \* \* \* \*